(12) United States Patent
Wada

(10) Patent No.: US 10,634,522 B2
(45) Date of Patent: Apr. 28, 2020

(54) ENCODER, PRINTER, AND ROBOT

(71) Applicant: Seiko Epson Corporation, Tokyo (JP)

(72) Inventor: Hiroshi Wada, Azumino (JP)

(73) Assignee: Seiko Epson Corporation (JP)

(*) Notice: Subject to any disclaimer, the term of this patent is extended or adjusted under 35 U.S.C. 154(b) by 103 days.

(21) Appl. No.: 15/958,235

(22) Filed: Apr. 20, 2018

(65) Prior Publication Data

US 2018/0306605 A1 Oct. 25, 2018

(30) Foreign Application Priority Data

Apr. 25, 2017 (JP) ................................. 2017-086609

(51) Int. Cl.
| | | |
|---|---|---|
| *G01D 5/34* | (2006.01) | |
| *B25J 9/16* | (2006.01) | |
| *B41J 2/21* | (2006.01) | |
| *B41J 3/407* | (2006.01) | |
| *G01D 5/347* | (2006.01) | |
| *G02B 27/12* | (2006.01) | |

(52) U.S. Cl.
CPC ............ *G01D 5/345* (2013.01); *B25J 9/1697* (2013.01); *B41J 2/2103* (2013.01); *B41J 3/4075* (2013.01); *G01D 5/347* (2013.01); *G01D 5/34707* (2013.01); *G02B 27/126* (2013.01); *Y10S 901/31* (2013.01); *Y10S 901/47* (2013.01)

(58) Field of Classification Search
CPC .......... G01D 5/345; G01D 5/344; G01D 5/34; G01D 5/34707; G01D 5/347; G01D 5/3473; G01D 5/34776; G01D 5/34784; G02B 27/126; B25J 9/1697; B25J 9/1694; B41J 2/2103; B41J 3/4075; Y10S 901/31; Y10S 901/47
See application file for complete search history.

(56) References Cited

U.S. PATENT DOCUMENTS 3,584,959 A * 6/1971 Del Carlo .............. G01D 5/345
356/368
4,967,072 A 10/1990 Nishimura
(Continued)

FOREIGN PATENT DOCUMENTS

| EP | 1674834 A2 | 6/2006 |
|---|---|---|
| JP | 06-194189 A | 7/1994 |

(Continued)

OTHER PUBLICATIONS

Extended European Search Report for EP Application No. 18169018.1, dated Sep. 17, 2018 (7 pages).

*Primary Examiner* — John R Lee
(74) *Attorney, Agent, or Firm* — Harness, Dickey & Pierce, P.L.C.

(57) ABSTRACT

An encoder includes an optical scale including a scale portion that is constituted with a polarizer, a light emitting portion which emits light, an optical element unit which divides the light into first light and second light and makes the first and second lights incident onto the scale portion, and a light receiving portion which receives the first light and the second light from the scale unit and outputs a signal corresponding to intensities of the received first light and second light, and in which the first light and the second light overlap other within a plane of the scale portion.

20 Claims, 19 Drawing Sheets

(56) References Cited

U.S. PATENT DOCUMENTS

| | | | | |
|---|---|---|---|---|
| 5,424,535 | A * | 6/1995 | Albion | G01D 5/345 |
| | | | | 250/225 |
| 5,602,388 | A * | 2/1997 | Maenza | G01D 5/34715 |
| | | | | 250/201.5 |
| 6,038,523 | A * | 3/2000 | Akahane | G01D 5/2492 |
| | | | | 368/250 |
| 7,476,844 | B2 * | 1/2009 | Igarashi | G01D 5/24404 |
| | | | | 250/231.13 |
| 8,297,727 | B2 * | 10/2012 | Katayama | B41J 11/008 |
| | | | | 347/16 |
| 2003/0141441 | A1 * | 7/2003 | Kawano | G01D 5/38 |
| | | | | 250/231.13 |
| 2003/0155489 | A1 * | 8/2003 | Yasuda | G01D 5/34715 |
| | | | | 250/225 |
| 2008/0186491 | A1 * | 8/2008 | Baxter | G01D 5/3473 |
| | | | | 356/364 |
| 2013/0128255 | A1 * | 5/2013 | Liu | G01D 5/34 |
| | | | | 355/72 |
| 2014/0311258 | A1 * | 10/2014 | Oguchi | G01D 5/3473 |
| | | | | 73/862.324 |
| 2014/0360804 | A1 * | 12/2014 | Oguchi | G01D 5/3473 |
| | | | | 180/446 |
| 2015/0292870 | A1 * | 10/2015 | Tamiya | G01D 5/34746 |
| | | | | 356/494 |
| 2016/0116757 | A1 * | 4/2016 | Kimura | G01D 5/38 |
| | | | | 250/231.1 |
| 2018/0170423 | A1 * | 6/2018 | Wada | B62D 5/0481 |
| 2018/0306605 | A1 * | 10/2018 | Wada | G01D 5/345 |
| 2019/0101418 | A1 * | 4/2019 | Wada | G01D 5/345 |

FOREIGN PATENT DOCUMENTS

| | | |
|---|---|---|
| JP | 07-081883 B2 | 9/1995 |
| JP | 2006-322835 A | 11/2006 |
| JP | 2008-241453 A | 10/2008 |

\* cited by examiner

ENCODER, PRINTER, AND ROBOT

BACKGROUND

1. Technical Field

The present invention relates to an encoder, a printer, and a robot.

2. Related Art

As one type of encoder, an optical rotary encoder is generally known (see, for example, JP-A-2008-241453). For example, the rotary encoder is used for a robot provided with a robot arm having a rotatable joint part, and detects a rotation state such as a rotation angle, a rotation position, the number of rotations, and a rotation speed of the joint part.

For example, the optical encoder disclosed in JP-A-2008-241453 includes a rotation polarizing plate attached to a rotation shaft, a first fixed polarizing plate provided so as to face the rotation polarizing plate, a second fixed polarizing plate provided on the same plane as the first fixed polarizing plate so as to face the rotation polarizing plate and has a polarization plane different by 45 degrees with respect to a polarization plane of the first fixed polarizing plate, a light source for allowing the rotation polarizing plate to be irradiated with light, first light receiving element for receiving light which is from the light source and has passed through the rotation polarizing plate and the first fixed polarizing plate and generating a first electric signal corresponding to the light, and second light receiving element for receiving light which is from the light source and has passed through the rotation polarizing plate and the second fixed polarizing plate and generating a second electric signal corresponding to the light.

However, in the optical encoder described in JP-A-2008-241453, since light that has passed through different positions of the rotation polarizing plate is received by the first light receiving element and the second light receiving element, there is a problem that detection accuracy is lowered due to the influence of variation in polarization characteristics in a plane of the rotation polarizing plate.

SUMMARY

An advantage of some aspects of the invention is to provide an encoder capable of improving detection accuracy, and to provide a printer and a robot that include the encoder.

The invention can be implemented as the following forms or application examples.

An encoder according to an application example includes a light emitting portion that emits light, an optical element unit that divides the light into first light and second light, an optical scale that includes a scale portion constituted with a polarizer and receiving the first light and the second light from the optical element unit, and a light receiving portion that receives the first light and the second light from the scale portion and outputs a signal corresponding to intensities of the received first light and second light, and in which the first light and the second light partially overlap each other in a plane of the scale portion.

According to such an encoder, firstly, since light from the light emitting portion is divided into first light and second light in the optical element unit and first light and second light are emitted toward the scale portion, the light emitting portion can be constituted with a single light source. For that reason, it is possible to eliminate deterioration in detection accuracy due to variation in output between two light sources as in the case of using two light sources. Furthermore, secondly, since first light and second light at least partially overlap each other in the plane of the scale portion, detection accuracy can be made hard to be influenced by the variation even if there is variation of in-plane characteristics of the scale portion. From such first and second points, detection accuracy can be improved.

In the encoder according to the application example, it is preferable that, when an incident angle of the first light with respect to the scale portion is set as θ1[°] and an incident angle of the second light with respect to the scale portion is set as θ2[°], a relationship of θ1≠θ2 is satisfied.

With this configuration, even when the scale portion is irradiated with the first light and the second light from the same direction in plan view, the first light and the second light (as reflected light or transmitted light) from the scale portion can be received at different positions. For that reason, it is possible to independently (individually) detect intensities of the received first light and the second light from the scale portion with high accuracy while reducing installation space of the light emitting portion and the light receiving portion. There is an advantage that the relationship of θ1≠θ2 is satisfied even when the scale portion is irradiated with the first light and the second light from different directions in plan view so that installation space of the light emitting portion and the light receiving portion can be reduced as compared with the case where the relationship of θ1=θ2 is satisfied.

In the encoder according to the application example, it is preferable that, when an angle formed between an incident direction of the first light and the incident direction of the second light to the scale portion is set as θ3 in plan view when seen from a normal direction of the scale portion, the relationship of θ3<180° is satisfied.

With this configuration, it is possible to miniaturize the optical element unit (compact installation by disposing a plurality of members constituting the optical element unit close to each other).

In the encoder according to this application example, it is preferable that the light receiving portion includes a first light receiving element that receives the first light and a second light receiving element that receives the second light.

With this configuration, it is possible to independently (individually) detect light intensities of first light and second light received from the scale portion with high accuracy, respectively.

In the encoder according to this application example, it is preferable that each of the first light receiving element and the second light receiving element locates at a side opposite to the light emitting part with respect to a virtual line segment that passes through the center of a portion where the first light and the second light overlap in the plane of the scale portion perpendicular to a virtual line segment connecting the center of the portion and the center of the light emitting portion with each other, in plan view when seen from the normal direction of the scale portion.

With this configuration, it is possible to miniaturize the optical element unit (compact installation by disposing a plurality of members constituting the optical element unit close to each other).

In the encoder according to the application example, it is preferable that the light emitting portion, the first light receiving element, and the second light receiving element are on the same straight line in plan view.

With this configuration, an area occupied by the optical element unit can be made small.

In the encoder according to the application example, it is preferable that the light emitting portion, the first light receiving element, and the second light receiving element are on the same straight line when seen from a direction in which the scale portion expands.

With this configuration, it is possible to easily install the light emitting portion, the first light receiving element and the second light receiving element on the same substrate.

In the encoder according to this application example, it is preferable that the light emitting portion, the first light receiving element, and the second light receiving element are disposed on the same substrate.

With this configuration, it is possible to simplify installation of the light emitting portion, the first light receiving element, and the second light receiving element.

In the encoder according to this application example, it is preferable that the optical scale includes a reflective plate disposed at a side opposite to the light emitting portion with respect to the scale portion.

With this configuration, a reflection type optical encoder can be realized.

In the encoder according to this application example, it is preferable that the optical scale is provided along a circumferential direction around the center axis of the optical scale and preferably has an identification pattern different every 90° or 180° in the circumferential direction.

With this configuration, an absolute type encoder can be realized.

In the encoder according to this application example, it is preferable that the optical element unit includes a beam splitter that divides the light into the first light and the second light, a reflective member that reflects at least one of the first light and the second light from the beam splitter toward the scale portion, and a phase difference plate disposed on an optical path of the first light or the second light from the beam splitter to the scale portion.

With this configuration, it is possible to irradiate the scale portion with the first light and the second light having different polarization directions by a relatively simple and compact configuration. Also, the polarization directions of the first light and the second light are different such that it is possible to output an A-phase signal and a B-phase signal from the light receiving portion.

An encoder according to an application example includes a light emitting portion that emits light, an optical element unit that divides the light into first light and second light, an optical scale that includes a scale portion constituted with a phase difference plate and receiving the first light and the second light from the optical element unit, and a light receiving portion that receives the first light and the second light from the scale portion and outputs a signal corresponding to intensities of the received first light and second light, and in which the first light and the second light partially overlap each other in a plane of the scale portion.

According to such an encoder, firstly, since light from the light emitting portion is divided into first light and second light in the optical element unit and first light and second light are emitted toward the scale portion, the light emitting portion can be constituted with a single light source. For that reason, it is possible to eliminate deterioration in detection accuracy due to variation in output between two light sources as in the case of using two light sources. Furthermore, secondly, since first light and second light at least partially overlap each other within the plane of the scale portion, detection accuracy can be made hard to be influenced by the variation even if there is variation of in-plane characteristics of the scale portion. From such first and second points, detection accuracy can be improved.

A printer according to an application example includes the encoder of the application example.

According to such a printer, detection accuracy of the encoder can be improved. For that reason, for example, it is possible to perform operation control of the printer with high accuracy by using the detection result of such an encoder.

A robot according to an application example includes the encoder of the application example.

According to such a robot, detection accuracy of the encoder can be improved. For that reason, for example, it is possible to high accurately perform operation control of the robot by using the detection result of such an encoder.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an encoder, a printer, and a robot according to aspects of the invention will be described in detail based on exemplary embodiments illustrated in the accompanying drawings.

1. Encoder

First Embodiment

Figure 1:
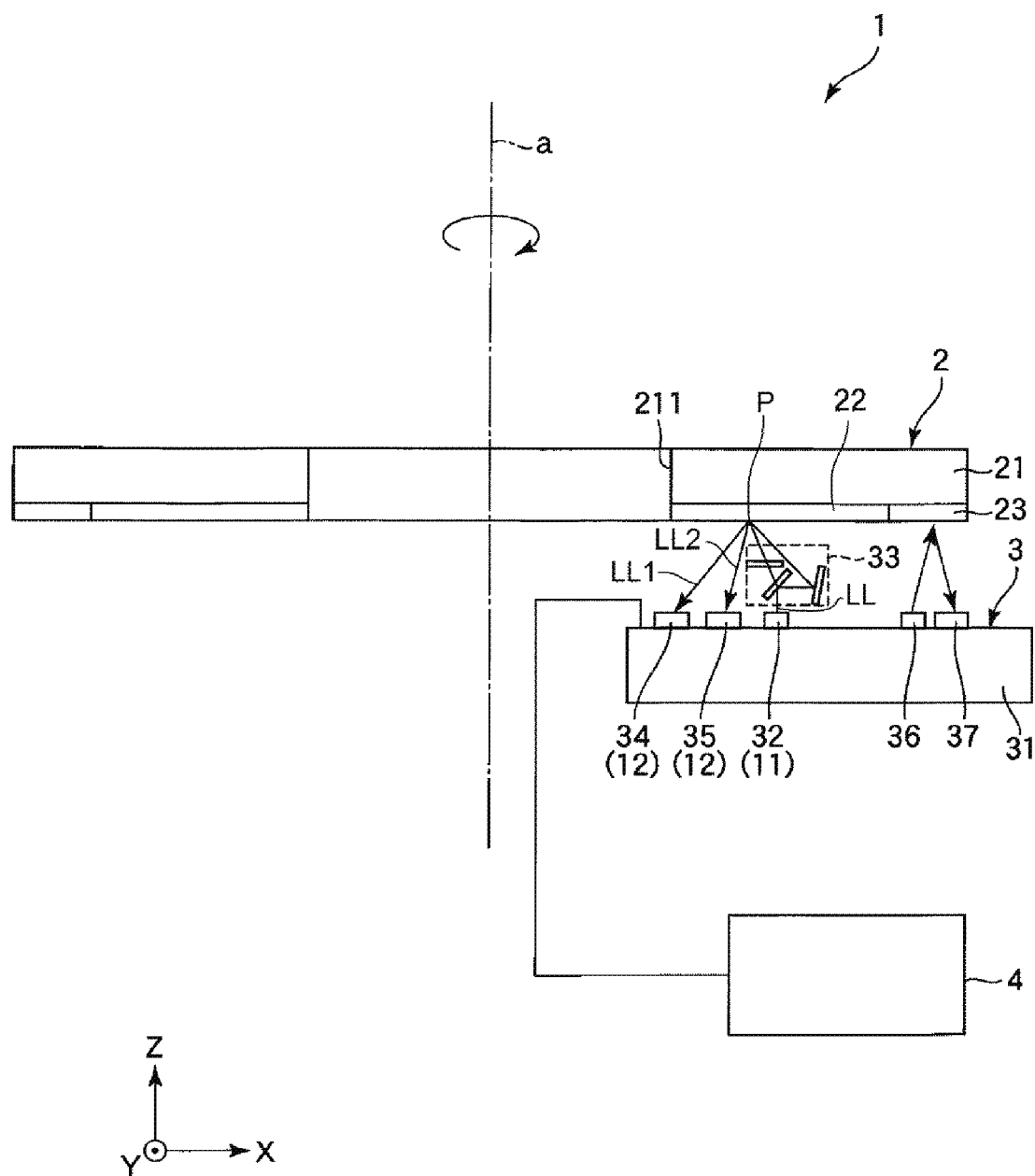
FIG. 1 is a cross-sectional view (a view cut along the XZ plane) schematically illustrating an encoder according to a first embodiment of the invention.
Figure 2:
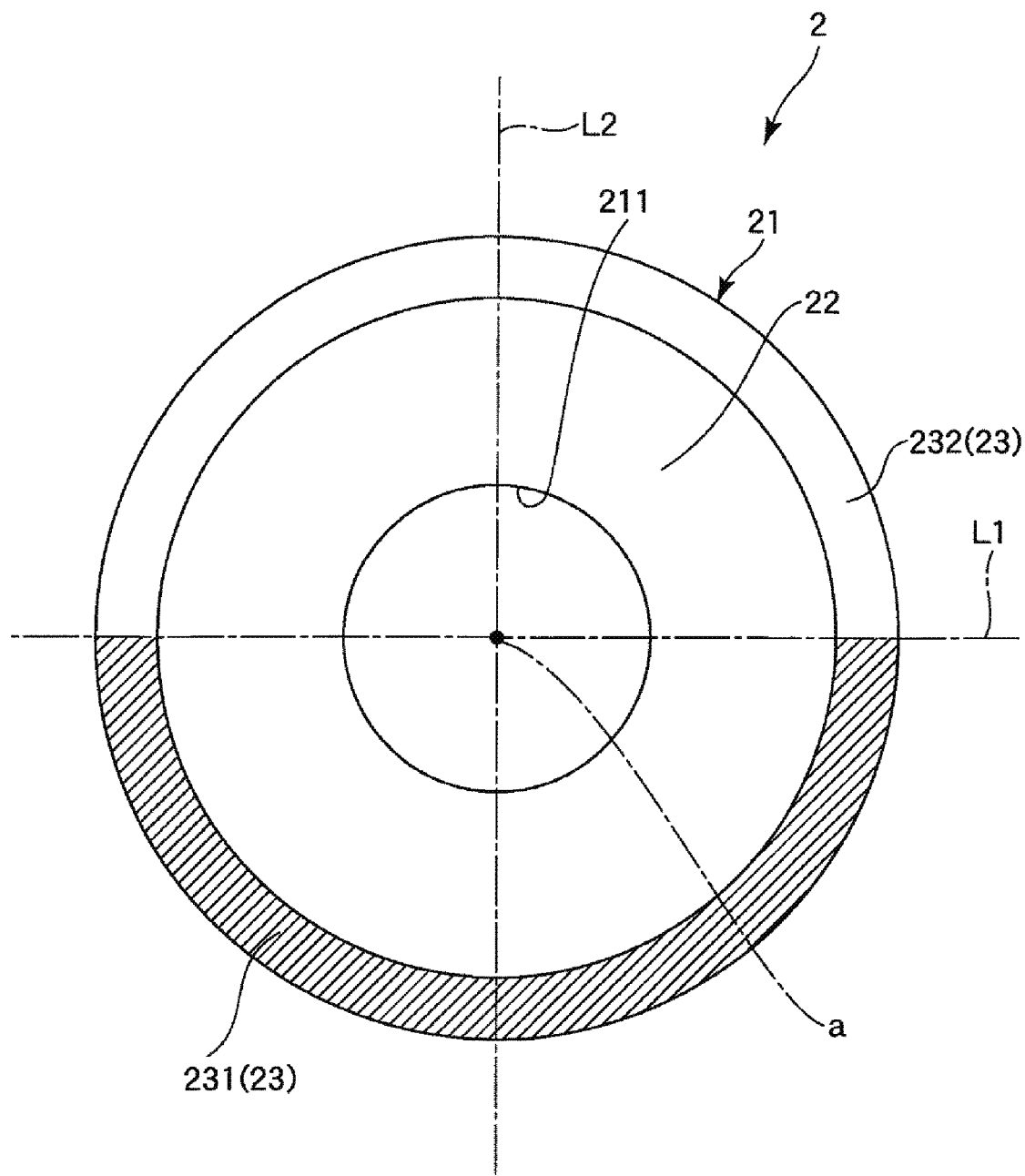
FIG. 2 is a plan view (a view when seen from a Z-axis direction) of an optical scale included in the encoder illustrated in FIG. 1.
Figure 3:
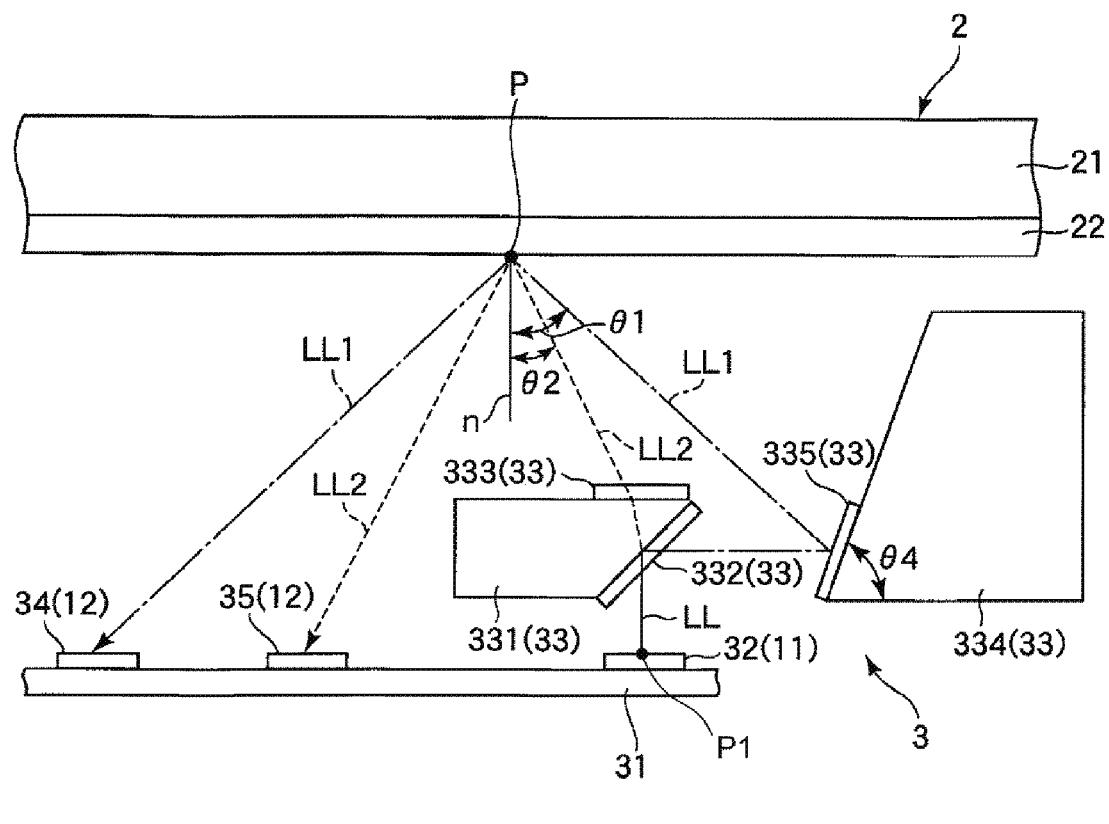
FIG. 3 is a schematic cross-sectional view (a view cut along the XZ plane) for explaining a sensor unit (a light emitting portion, a light receiving portion, and an optical element unit) included in the encoder illustrated in FIG. 1.
Figure 4:
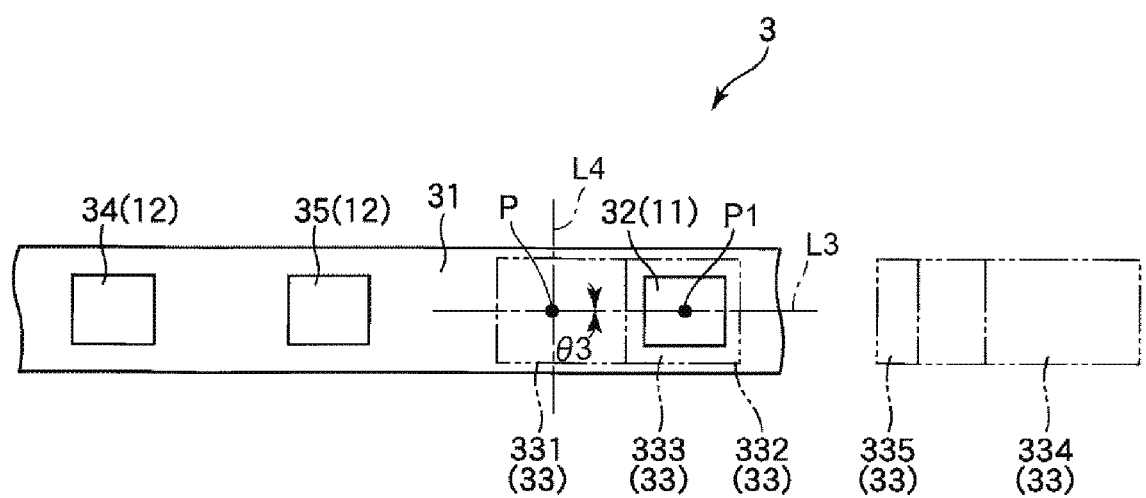
FIG. 4 is a plan view (a view when seen from the Z-axis direction) of the sensor unit illustrated in FIG. 3.
Figure 4:
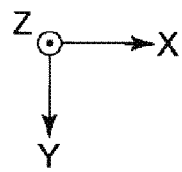
Figure 5:
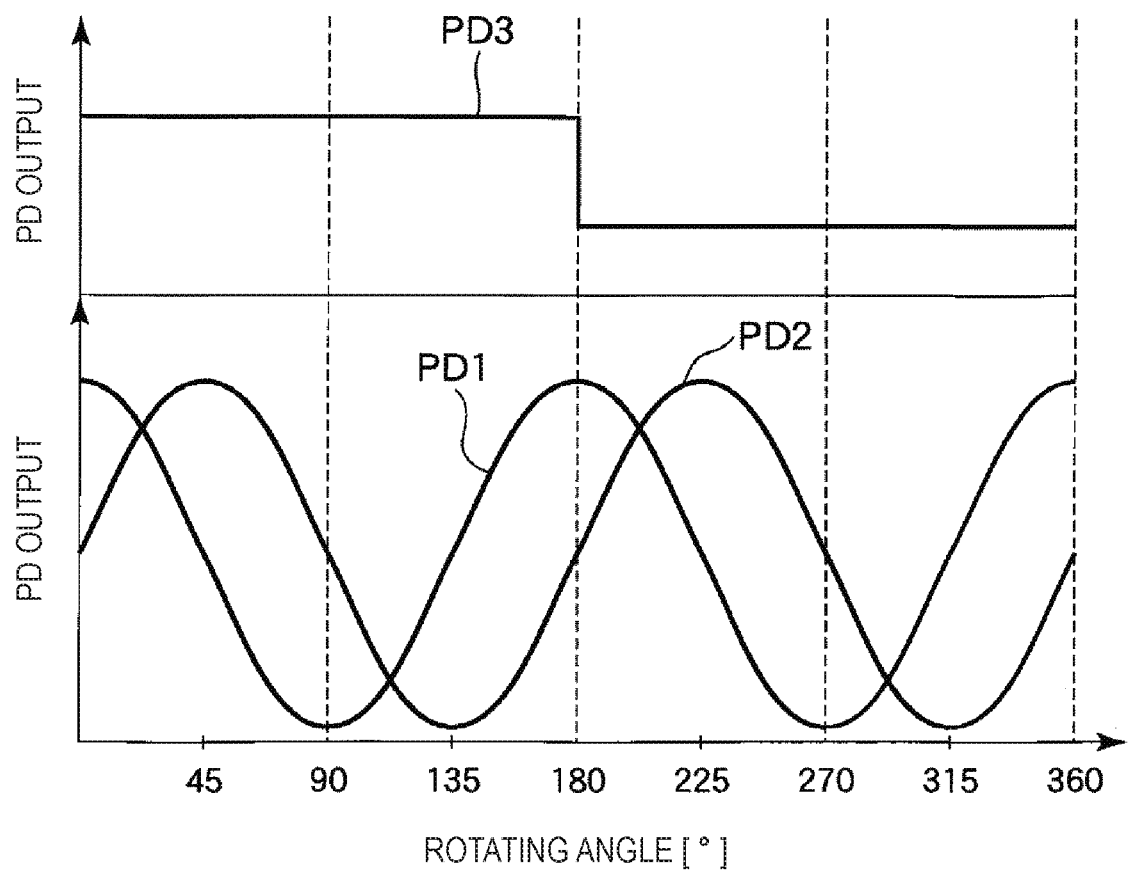
FIG. 5 is a graph illustrating a relationship between a rotation angle of the optical scale of the encoder illustrated in FIG. 1 and a current value (PD output) generated in the light receiving portion.

FIG. 1 is a cross-sectional view (a view cut along the XZ plane) schematically illustrating an encoder according to a first embodiment of the invention. FIG. 2 is a plan view (a view when seen from a Z-axis direction) of an optical scale included in the encoder illustrated in FIG. 1. FIG. 3 is a schematic cross-sectional view (a view cut along the XZ plane) for explaining a sensor unit (a light emitting portion, a light receiving portion, and an optical element unit) included in the encoder illustrated in FIG. 1. FIG. 4 is a plan view (a view when seen from the Z-axis direction) of the sensor unit illustrated in FIG. 3. FIG. 5 is a graph illustrating a relationship between a rotation angle of the optical scale of the encoder illustrated in FIG. 1 and a current value (PD output) generated in the light receiving portion.

In the following description, for convenience of explanation, description will be made appropriately using three axes of the X-axis, the Y-axis, and the Z-axis which are orthogonal to each other. Further, for these axes, a tip end side and a base end side of the arrow illustrated in the figure are referred to as "+" and "−", respectively, and directions parallel to the X-axis, the Y-axis, and the Z-axis are referred to as an "X-axis direction", a "Y-axis direction", and a "Z-axis direction", respectively. The +Z-axis direction side is referred to as "up" and the −Z-axis direction side is referred to as "down". Also, a plane parallel to the X-axis and the Y-axis is referred to as an "XY plane", a plane parallel to the X-axis and the Z-axis is referred to as an "XZ plane", and a plane parallel to the Y-axis and the Z-axis is referred to as a "YZ plane".

An encoder 1 illustrated in FIG. 1 is a reflection type optical rotary encoder. The encoder 1 includes an optical scale 2 that rotates around a rotation axis a along the Z-axis direction, a sensor unit 3 that is fixedly installed so as to face the optical scale 2, an operation portion 4 that is electrically connected to sensor unit 3.

The optical scale 2 includes a substrate 21, a scale portion 22 provided on one surface (lower surface) of the substrate 21, and a 180° determination track 23. The sensor unit 3 includes a substrate 31, light emitting elements 32 and 36 and light receiving elements 34, 35, and 37 provided on the surface of the substrate 31 which is on the optical scale 2 side, and an optical element unit 33 disposed between the scale portion 22 and the light emitting element 32.

In the encoder 1, the light emitting element 32 emits light LL which is linearly polarized, and the optical element unit 33 divides light LL into first light LL1 and second light LL2, and deviates a polarization direction of one of first light LL1 and second light LL2 by 45° with respect to the other thereof, makes one of first light LL1 and second light LL2 incident on the scale portion 22. Then, the light receiving element 34 receives first light LL1 reflected by the scale portion 22 and outputs a signal corresponding to intensity of the received first light LL1. The light receiving element 35 receives second light LL2 reflected by the scale portion 22 and outputs a signal corresponding to intensity of the received second light LL2.

Here, the scale portion 22 is constituted with a polarizer. A signal output from one of the light receiving elements 34 and 35 is an A phase signal having the rotation angle of 180° of the optical scale 2 as one cycle. A signal output from the other one of the light receiving elements 34 and 35 is a B phase signal having a rotation angle of 180° of the optical scale 2 as one cycle and a phase thereof is deviated by 45° from the A phase signal. The light emitting element 32 constitutes the light emitting portion 11 that emits light LL. The light receiving elements 34 and 35 constitute a light receiving portion 12 which receives first light LL1 and second light LL2 from the scale portion 22 and outputs a signal corresponding to intensities of the received first light LL1 and second light LL2.

In the first embodiment, the light emitting element 36 irradiates light toward the 180° determination track 23, and the light receiving element 37 receives the light reflected by the 180° determination track 23 and outputs a signal corresponding to intensity of the received light. Here, the signal output from the light receiving element 37 is a 180° determination signal for determining (distinguishing) a rotation state of the optical scale 2 as being in a state different by 180°.

The operation portion 4 determines a rotating state (rotating angle, rotating speed, rotating direction, and the like) of the optical scale 2 based on the signals (A phase signal and B phase signal) from the light receiving elements 34 and 35 and the signal (180° determination signal) from the light receiving element 37. In a case where the encoder 1 is used as an incremental encoder, the 180° determination track 23 can be omitted.

In the following, each component of the encoder 1 will be described in detail.

Optical Scale

As illustrated in FIG. 2, the optical scale 2 has a disk shape and a hole 211 penetrating in the thickness direction is provided in the center portion thereof. The optical scale 2 is attached to a member (not illustrated) that rotates around the rotation axis a. As described above, the optical scale 2 includes the substrate 21, the scale portion 22 provided on one surface of the substrate 21, and the 180° determination track 23.

On a surface of one side (lower side in FIG. 1) of the substrate 21, the scale portion 22 and the 180° determination track 23 are disposed side by side in this order from the center side toward the outer circumferential side of the substrate 21. In a case of integrally constituting the scale portion 22 and the 180° determination track 23, the substrate 21 can be omitted.

The scale portion 22 is constituted with a polarizer, and has polarization characteristics that selectively transmit P-polarized light and reflect S-polarized light. The scale portion 22 has, for example, a polarization pattern (wire grid) constituted by arranging a plurality of wires having reflectivity against light from the light emitting element 32 in parallel at intervals between each other, and reflects light vibrating in a direction parallel to a direction in which the wire extends, and transmits light vibrating in a direction perpendicular to the direction in which the wire extends. Here, the substrate 21 has light absorptivity, or a light absorbing portion such as an optical thin film having light absorptivity is disposed between the substrate 21 and the scale portion 22. Accordingly, light reflected by the scale portion 22 is received by the light receiving element 34 or 35 described above, and light transmitted through the scale portion 22 is not received by the light receiving elements 34 and 35. As a constituent material of the polarization pattern, for example, a metal material such as aluminum (Al), copper (Cu), chromium (Cr), gold (Au), iron (Fe), platinum (Pt) or an alloy thereof may be included. That is, the scale portion 22 has a plurality of metal wires extending linearly. Such a scale portion 22 may be formed by using a known film formation method, for example, or may be formed by processing a sheet-shaped or plate-shaped member with etching or the like.

The polarization pattern may be constituted with a plurality of wires having light absorptivity and in this case, the substrate 21 has light reflectivity, or a reflective portion such as a metal film having light reflectivity is disposed between the substrate 21 and the scale portion 22, and light transmitted through the scale portion 22 is reflected by the substrate 21 or the reflective portion and is received by the light receiving element 34 or 35. The scale portion 22 is not limited to the configuration using the wire grid polarizing plate, and for example, an organic polarizing plate using iodine or a dichroic dye may be used. In this case, light reflected between the substrate 21 and the scale portion 22 is received by the light receiving element 34 or 35.

The 180° determination track 23 is provided along a circle centered on the rotation axis a, and when seen from a direction along the rotation axis a or the Z-axis (hereinafter, also referred to as "plan view"), and is constituted with two areas 231 and 232 which are divided in two (divided in two vertically in FIG. 2) by a line segment L1 passing through the rotation axis a. That is, the area 231 is provided in a range of 180° of the entire range of 360° in the circumferential direction of the 180° determination track 23 and the area 232 is provided in the remaining 180° range thereof.

The two areas 231 and 232 have different reflectances from each other. Specifically, one area 231 of the two areas 231 and 232 has reflectivity to light from the light emitting element 36, and the other area 232 has transparency to light from the light emitting element 36. Accordingly, the reflectance of the area 231 with respect to the light from the light emitting element 36 is higher than the reflectance of the area 232 with respect to the light from the light emitting element 36.

Here, in the area 231, a thin film having reflectivity to light from the light emitting element 36 is provided, whereas in the area 232, the thin film is not provided. As a constituent material of the thin film provided in the area 231, for example, the same metallic material as the polarization pattern of the scale portion 22 described above is included. Such a thin film of the area 231 can be formed by using, for example, a known film formation method, or can also be formed together with the polarization pattern of the scale portion 22 described above. In the area 232, a thin film (thin film having antireflection property or absorptivity to light from the light emitting element 36) having a lower reflectance to light from the light emitting element 36 than the thin film provided in the area 231, for example, a black coating film, a dielectric multilayer film, or the like may be provided.

Sensor Unit

The sensor unit 3 is used by being attached to a member (not illustrated) that does not rotate around the rotation axis a. As described above, the sensor unit 3 includes the substrate 31, the light emitting elements 32 and 36 and the light receiving elements 34, 35, and 37 provided on the surface of the optical scale 2 side of the substrate 31, the optical element unit 33 disposed between the light emitting element 32 and the scale portion 22.

The substrate 31 is, for example, a wiring board, supports the light emitting elements 32 and 36 and the light receiving elements 34, 35, and 37, and is electrically connected thereto. Then, the substrate 31 is electrically connected to the operation portion 4 illustrated in FIG. 1 via wires (not illustrated). In the first embodiment, as illustrated in FIGS. 3 and 4, the light emitting element 32, the light receiving element 35, and the light receiving element 34 disposed on the substrate 31 are arranged side by side in this order so as to extend from the +X-axis direction side to the −X-axis direction side (from the outer circumferential side of the substrate 21 toward the center thereof in plan view), and these elements are disposed on the same straight line along the X-axis direction.

The light emitting element 32 (light emitting portion 11) is, for example, a vertical cavity surface emitting laser (VCSEL) and has a function of emitting linearly polarized light LL. As such, the light emitting element 32 constitutes the light emitting portion 11 that emits light LL. Here, the "linearly polarized light" is light in which a vibration plane of the electromagnetic wave (light) is in one plane, in other words, is light of which the vibration direction in the electric field (or magnetic field) is constant. Also, light emitted from the light emitting element 32 may include components other than the linearly polarized light component, or the polarization direction thereof may be changed. In this case, each of components other than the linearly polarized light component and variation in the polarization direction is preferably as small as possible (making each of an amount of the other component and a variation angle in the polarization direction with respect to a desired linearly polarized light component be 5% or less).

The light emitting portion 11 is not limited to a configuration using a surface emitting laser as the light emitting element 32 as long as the light emitting portion 11 can emit the linearly polarized light LL. For example, the light emitting portion 11 may have a configuration in which a light emitting diode is used as the light emitting element 32 and a polarizing plate is provided between the light emitting element 32 and the optical element unit 33 (more specifically, a reflective film 332 which will be described later). Between a beam splitter 331 and the light emitting element 32, a lens such as a collimator lens for converting light LL from the light emitting element 32 into parallel light may be provided as needed.

The optical element unit 33 is supported by a support member (not illustrated) so that the position of the optical element unit 33 with respect to the substrate 31 is fixed. The optical element unit 33 has a function of dividing light LL from the light emitting element 32 into two light beams of first light LL1 and second light LL2, a function of allowing the same irradiation point P of the scale portion 22 to be irradiated with first light LL1 and second light LL2, and a function of deviating the polarization direction of one of first light LL1 and second light LL2 by 45° with respect to the polarization direction of the other thereof.

The optical element unit 33 of the first embodiment includes a beam splitter 331 provided with a reflective film 332, a phase difference plate 333 disposed on the beam splitter 331, a reflective member 334 provided with a reflective film 335.

The beam splitter 331 (main body) is made of, for example, an optical material such as a resin material, a glass material, a crystal material or the like, and has light transparency. The beam splitter 331 has a surface facing the substrate 31 side and inclined by a predetermined angle (45° in the figure) with respect to the XY plane in the +Z-axis direction side with respect to the light emitting element 32, and the reflective film 332 (semi-reflective film) is provided on the surface (inclined surface). A surface along the XY plane is provided on the side opposite to the light emitting element 32 (on the +Z-axis direction side) with respect to the reflective film 332 of the beam splitter 331, and the phase difference plate 333 is disposed on the surface.

Since the reflective film 332 is formed on the inclined surface of the beam splitter 331, the reflective film 332 has a function of reflecting a portion of light LL to the +X-axis direction side to be first light LL1 and transmitting the remaining portion thereof to the +Z-axis direction side to be second light LL2, and is made of, for example, a metal thin film having a reflectance of 50% and a transmittance of 50%, a dielectric multilayer film, and the like. Here, second light LL2 from the reflective film 332 travels inside the beam splitter 331 and is then emitted from the beam splitter 331. In this case, since a refractive index of the material constituting the beam splitter 331 is larger than the refractive index of air, second light LL 2 is emitted from the beam splitter 331 while being inclined at a predetermined angle (for example, approximately 30° in the case where the beam splitter 331 is made of polycarbonate) with respect to the Z axis. With this, second light LL2 is incident on the scale portion 22 at an incident angle $\theta 2$ corresponding to the predetermined angle with respect to a normal line n (line segment along the Z-axis direction) of the scale portion 22. Here $\theta 2$ is not zero ($\theta 2 \neq 0$).

In the first embodiment, the phase difference plate 333 is a λ/2 phase difference plate (optical element that generates phase difference (optical path difference) corresponding to ½ wavelength in two orthogonal polarization components), and has a function of deviating the polarization direction of second light LL2 emitted from the beam splitter 331 by 45° with respect to first light LL1. The phase difference plate 333 may not be connected to the surface of the beam splitter 331 as long as it is located between the beam splitter 331 and the scale portion 22. The phase difference plate 333 may be provided between the beam splitter 331 and the reflective member 334 or between the reflective member 334 and the scale portion 22. In this case, the phase difference plate 333 is set so that deviation of the phase of the signal from the light receiving elements 34 and 35 is set to be the same as in the case of the configuration described above.

The reflective member 334 has a surface facing the scale portion 22 side (side opposite to the substrate 31) and inclined at an inclination angle $\theta 4$ (for example, 45° to 70°) with respect to the XY plane in the +X-axis direction side with respect to the reflective film 332 described above, and a reflective film 335 is provided on the surface. The reflective film 335 has a function of reflecting (preferably, totally reflecting) first light LL1, and is made of, for example, a metal thin film having the reflectance of 100%, a dielectric multilayer film, or the like. First light LL1 reflected by such a reflective film 335 is incident onto the scale portion 22 (line segment along the Z-axis direction) at an incident angle $\theta 1$ different from the incident angle $\theta 2$ described above with respect to the normal line n (line segment along the Z-axis direction) of the scale portion 22 (in the first embodiment, the incident angle $\theta 1$ is larger than the incident angle $\theta 2$). The incident angle $\theta 1$ satisfies the relationship of $\theta 1 \neq 0$ and is determined by the inclination angles of the reflective films 332 and 335 described above. For example, in a case where the inclination angle of the reflective film 332 is 45° and the inclination angle $\theta 4$ of the reflective film 335 is 67.5°, the incident angle $\theta 1$ becomes 45°. A constituent material of the reflective member 334 is not particularly limited as long as the reflective film 335 can exhibit the function described above, but the same material as the constituent material of the beam splitter 331 can be used.

The light receiving elements 34 and 35 (light receiving portion 12) are, for example, photodiodes using GaAs or Si, respectively. The light receiving element 34 has a function of receiving first light LL1 reflected by the scale portion 22 and outputting a current corresponding to intensity of the received light LL1 as a detection signal. The light receiving element 35 has a function of receiving second light LL2 reflected by the scale portion 22 and outputting a current corresponding to intensity of the received light LL2 as a detection signal. As such, the light receiving elements 34 and 35 constitute the light receiving portion 12 which receives first light LL1 and second light LL2 from the scale portion 22 and outputs a signal corresponding to intensities of the received light LL1 and light LL2.

The light emitting element 36 illustrated in FIG. 1 is, for example, a surface emitting laser or a light emitting diode, and light to be emitted may or may not be polarized. The light emitting element 36 irradiates light toward the 180° determination track 23.

The light receiving element 37 illustrated in FIG. 1 is, for example, a photodiode using GaAs or Si, and has a function of receiving light reflected by the 180° determination track 23 and outputting a current corresponding to intensity of the received light as a detection signal.

The operation portion 4 illustrated in FIG. 1 is constituted to include, for example, a central processing unit (CPU) and a static random access memory (SRAM), and has a function of determining a rotating state of the optical scale 2 using signals from the light receiving elements 34, 35, and 37. As the rotating state, for example, a rotating position, a rotating angle, a rotating speed, a rotating direction, and the like are included.

As described above, first light LL1 and second light LL2 obtained by dividing light LL emitted from the light emitting element 32 are linearly polarized, and the polarization direction of one of first light LL1 and second light LL2 is deviated by 45° with respect to the polarization direction of the other thereof. The scale portion 22 irradiated with first light LL1 and second light LL2 has polarization characteristics that selectively transmit P-polarized light and reflect S-polarized light.

By such a scale portion 22, the reflectance of each of first light LL1 and second light LL2 at the scale portion 22 which is irradiated with the first and second light LL1 and LL2 changes according to the rotating angle of the optical scale 2. Accordingly, a current value (PD output) of signals (PD1 and PD2 in FIG. 5) from the light receiving elements 34 and 35 that receive first light LL1 and second light LL2 changes along a sinusoidal wave according to a rotating angle (rotation angle) of the optical scale 2, as illustrated in FIG. 5. However, as described above, since the polarization directions of first light LL1 and second light LL2 are different from each other, the phases of the signals from the light receiving elements 34 and 35 are deviated by 45° according to deviation in the polarization direction.

Here, the signal from one of the light receiving elements 34 and 35 is the A phase signal and the signal from the other thereof is the B phase signal which is deviated in phase by 45° from the A phase signal. By using such an A phase signal and a B phase signal in combination, it is possible to determine the angle within the range of the rotating angle of the optical scale 2 which is the range of 0 to $\pi$ or the range of $\pi$ to $2\pi$. However, the signals from the light receiving elements 34 and 35 have the same waveforms in the range of 0 to $\pi$ and the range of $\pi$ to $2\pi$. For that reason, it is unable to distinguish between a case where a rotating angle of the optical scale 2 is 0° to 180° and a case where the rotating angle of the optical scale 2 is 180° to 360° only with the signals (A phase signal and B phase signal) from the light receiving element 34.

On the other hand, the reflectance of light irradiated on the 180° determination track 23 changes in a binary manner according to the rotating angle of the optical scale 2. Accordingly, as illustrated in FIG. 5, a current value (PD output) of the signal (PD3 in FIG. 5) from the light receiving element 37 changes in a binary manner according to the rotating angle (rotation angle) of the optical scale 2. Here, the signal from the light receiving element 37 has different values in the range of 0 to $\pi$ or the range of $\pi$ to $2\pi$. For that reason, it is possible to determine between the case where the rotating angle of the optical scale 2 is 0 to 180° and the case where the rotating angle of the optical scale 2 is 180° to 360°, by using the signal (180° rotation determination signal) from the light receiving element 37.

As described above, the encoder 1 includes the light emitting portion 11 that emits light LL, the optical element unit 33 that divides light LL into first light LL1 and second light LL2, the optical scale 2 including the scale portion 22 which is constituted with a polarizer and receives first light LL1 and second light LL2 from the optical element unit 33, and the light receiving portion 12 that receives first light LL1 and second light LL2 from the scale portion 22 and outputs a signal corresponding to intensities of the received first light LL1 and second light LL2. In particular, first light LL1 and second light LL2 at least partially overlap each other within the plane of the scale portion 22.

According to such an encoder 1, firstly, since light LL on the way of directing from the light emitting portion 11 to the scale portion 22 is divided into first light LL1 and second light LL2 in the optical element unit 33, it is possible to constitute the light emitting portion 11 with a single light source (light emitting element 32 in the first embodiment). For that reason, it is possible to eliminate deterioration in detection accuracy due to variation in output between two light sources as in the case of using two light sources (light emitting elements). Furthermore, secondly, since first light LL1 and second light LL2 at least partially overlap each other within the plane of the scale portion 22, detection accuracy can be made hard to be influenced by the variation even if there is variation of in-plane characteristics of the scale portion. From such first and second points, detection accuracy of the encoder 1 can be improved.

Here, it suffices that first light LL1 and second light LL2 include the same irradiation point P in the plane of the scale portion 22, and spot diameters and spot shapes on the scale portion 2 may be identical to each other or different from each other, respectively. However, in a case where the spot diameters are different, the ratio of the spot diameters is preferably 0.5 or more and 1.5 or less, more preferably 0.8 or more and 1.2 or less. The optical axes (center axes) of first light LL1 and second light LL2 are preferably as close as possible to the irradiation point P. In addition, one of first light LL1 and second light LL2 is preferably overlap the other thereof by 50% or more, more preferably overlap the other thereof by 80% or more, in the plane of the scale portion 22.

In particular, in the encoder 1, when an incident angle of first light LL1 with respect to the scale portion 22 is set as $\theta1[°]$ and an incident angle of second light LL2 with respect to the scale portion 22 is set as $\theta2[°]$, a relationship of $\theta1 \neq \theta2$ (in the first embodiment, the relationship of $\theta1 > \theta2$) is satisfied (see FIG. 3). With this, even when the scale portion 22 is irradiated with first light LL1 and second light LL2 from a direction close to each other in plan view, first light LL1 and second light LL2 (as reflected light or transmitted light) from the scale portion 22 can be received at different positions. For that reason, it is possible to independently (individually) detect light intensities of the received first light LL1 and second light LL2 from the scale portion 22 with high accuracy using the light receiving elements 34 and 35, respectively, while reducing installation space of the light emitting portion 11 and the light receiving portion 12.

Also, when an angle formed between an incident direction of first light LL1 and the incident direction of second light LL2 to the scale portion 22 is set as $\theta3$ in plan view, the relationship of $\theta3 < 180°$ is satisfied (in the first embodiment $\theta3 = 0$). With this, it is possible to miniaturize the optical element unit 33 (compact installation by disposing a plurality of members constituting the optical element unit 33 close to each other). The invention is not limited to the case of $\theta3 = 0°$. For example, it is possible to set $\theta3$ to any angle within a range smaller than 180° by appropriately changing the shape and disposition of the beam splitter 331 and the reflective member 334, or by appropriately adding other optical components.

The light receiving portion 12 includes the light receiving element 34 which is a first light receiving element for receiving first light LL1 and the light receiving element 35 which is a second light receiving element for receiving second light LL2. With this, it is possible to independently (individually) detect light reception intensities of first light LL1 and second light LL2 from the scale portion 22 with high accuracy.

In the first embodiment, in plan view, a virtual line segment that passes through the irradiation point P perpendicular to a virtual line segment L3, which connects the center (irradiation point P) of a portion where first light LL1 and second light LL2 overlap in the plane of the scale portion 22 and the center P1 of the light emitting portion 11, is set as L4, each of the light receiving elements 34 and 35 (first and second light receiving elements) locates at a side opposite to the light emitting portion 11 (see FIG. 4) with respect to the virtual line segment L4 in plan view. With this, it is possible to miniaturize the optical element unit 33 (compact installation by disposing a plurality of members constituting the optical element unit 33 close to each other).

The light emitting portion 11, the light receiving element 34 (first light receiving element), and the light receiving element 35 (second light receiving element) are on the same straight line, in plan view (see FIG. 4). With this, an area occupied by the optical element unit 33 in plan view can be made small.

Furthermore, the light emitting portion 11, the light receiving element 34 (first light receiving element), and the light receiving element 35 (second light receiving element) are disposed on the same substrate 31. With this, it is possible to simplify installation of the light emitting portion 11, the light receiving element 34, and the light receiving element 35.

Here, when seen from the direction in which the scale portion 22 expands (direction along the XY plane), the light emitting portion 11, the light receiving element (first light receiving element) and the light receiving element 35 (second light receiving element) are on the same straight line (see FIG. 3). With this, it is possible to easily install the light emitting portion 11, the light receiving element 34, and the light receiving element 35 on the same substrate 31.

In the present embodiment, the optical element unit 33 includes the beam splitter 331 that divides light LL into first light LL1 and second light LL2, the reflective member 334 that reflects at least one (first light LL1 in the first embodiment) of first light LL1 and second light LL2 from the beam splitter 331 toward the scale portion 22, and the phase difference plate 333 disposed on an optical path (optical path of second light LL2 in the first embodiment) of first light LL1 or second light LL2 from the beam splitter 331 to the scale portion 22. With this, it is possible to irradiate the scale portion 22 with first light LL1 and second light LL2 having different polarization directions by a relatively simple and compact configuration. Also, since the polarization directions of first light LL1 and second light LL2 are different from each other, it is possible to output the A-phase signal and the B-phase signal from the light receiving portion 12.

.The optical scale 2 has the 180° determination track 23 which is provided along the circumferential direction around the rotation axis a (center axis) of the optical scale 2 and which is an identification pattern different every 180° in the circumferential direction thereof. With this, it is possible to realize the encoder 1 of the absolute type (polarizing method in the first embodiment).

Second Embodiment

Figure 6:
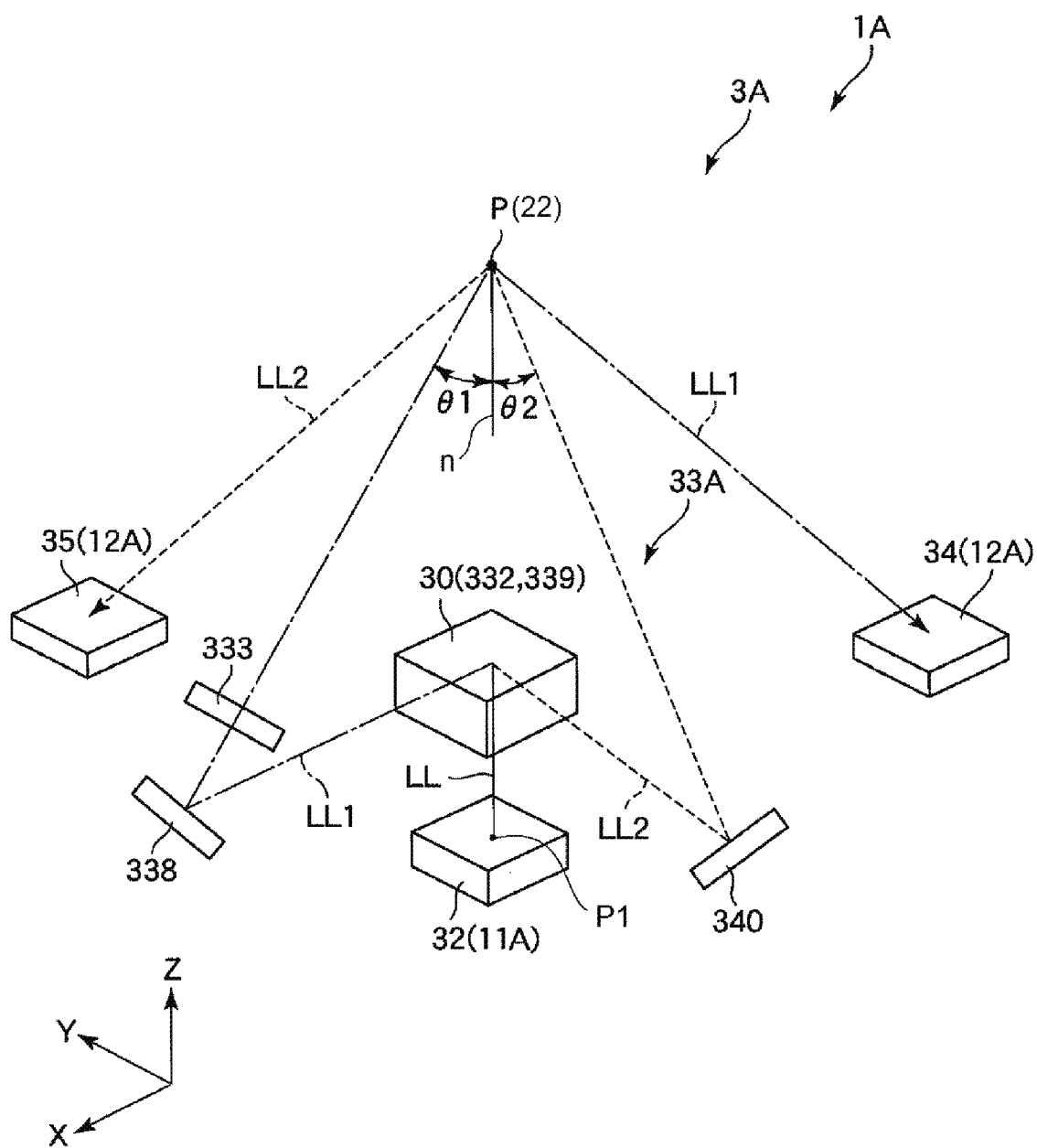
FIG. 6 is a diagram conceptually illustrating an encoder according to a second embodiment of the invention.
Figure 7:
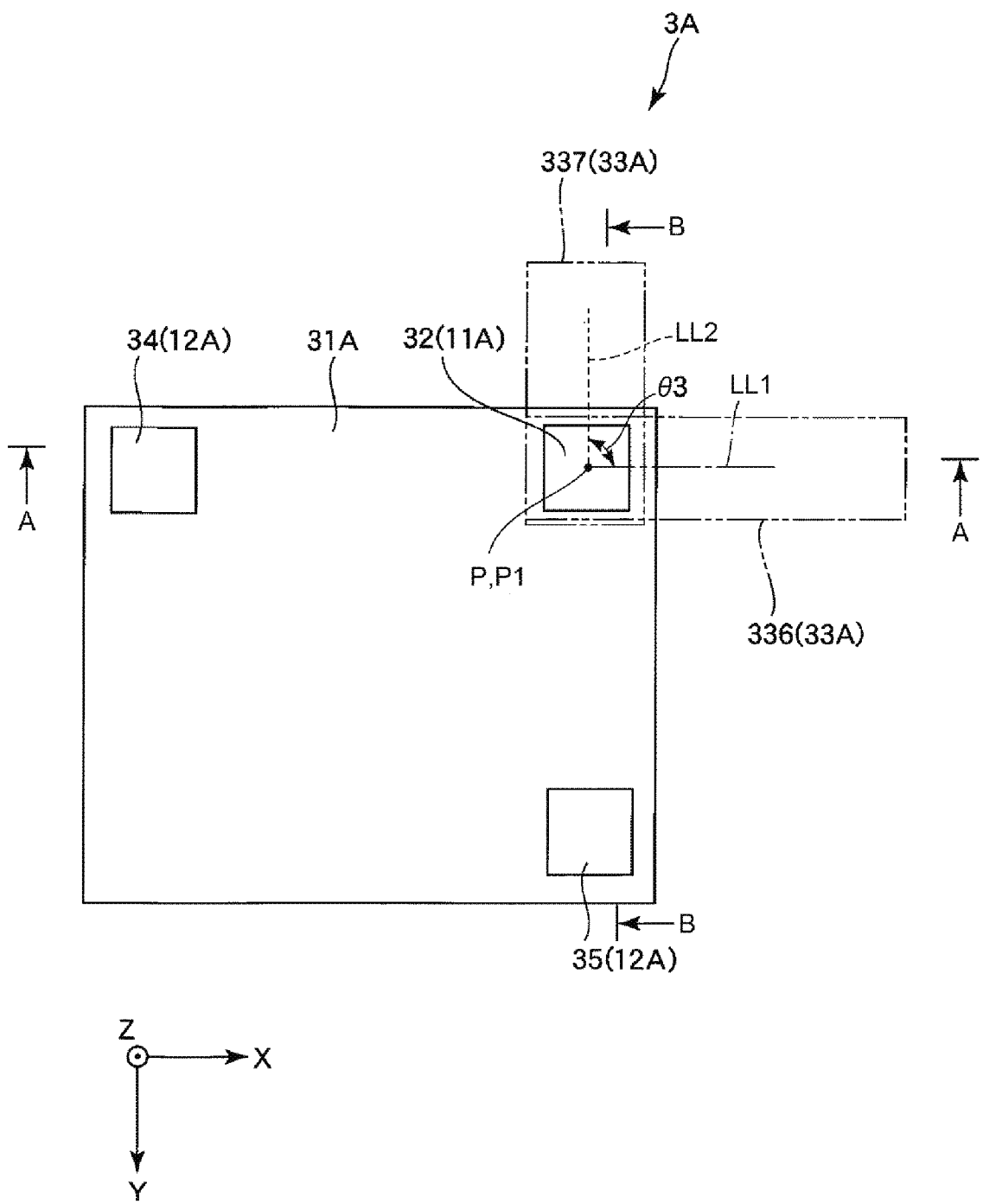
FIG. 7 is a plan view (a view when seen from the Z-axis direction) of a sensor unit (a light emitting portion, a light receiving portion, and an optical element unit) included in the encoder illustrated in FIG. 6.
Figure 8:
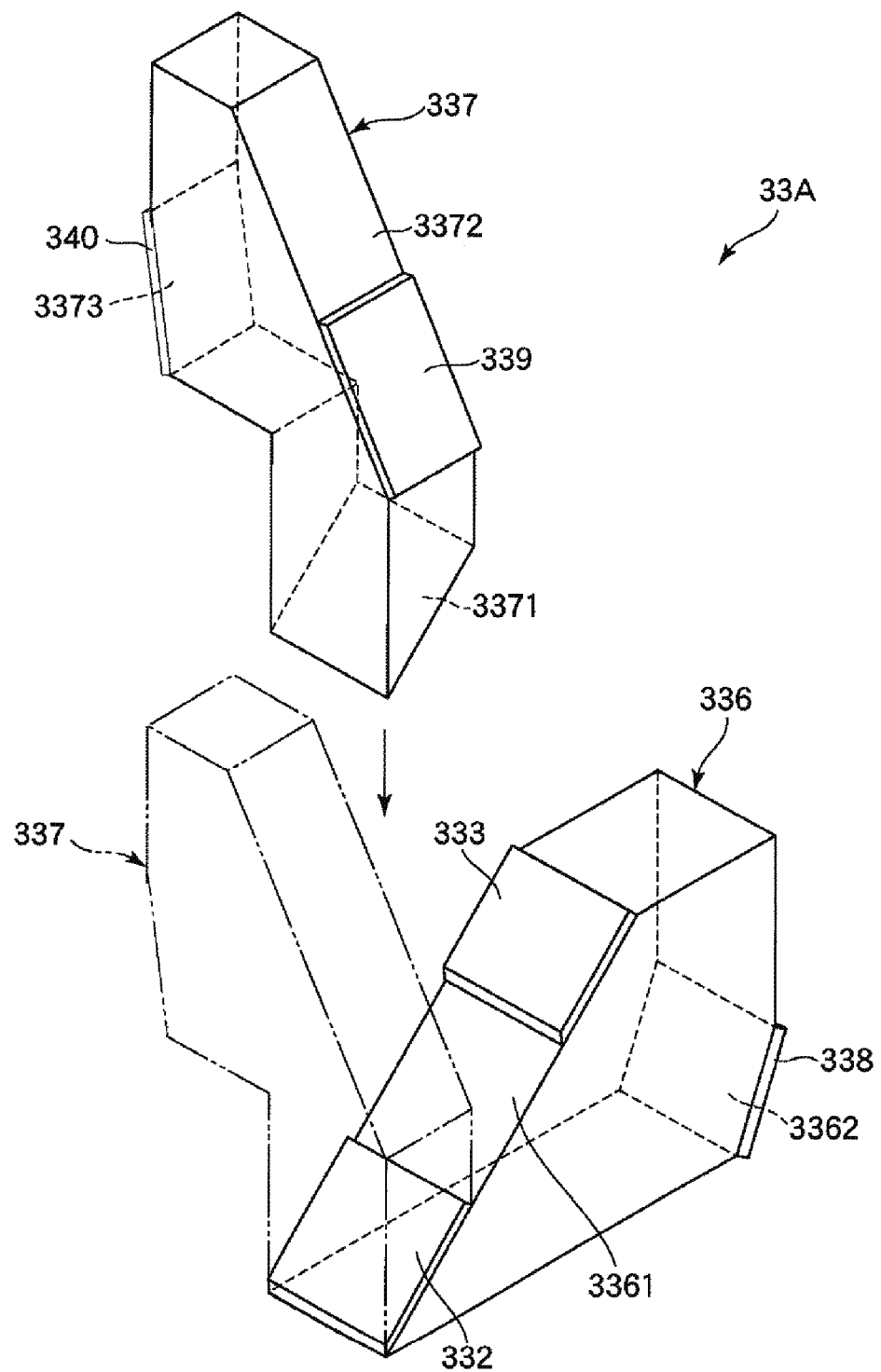
FIG. 8 is an exploded perspective view of an optical element unit included in the sensor unit illustrated in FIG. 7.
Figure 9:
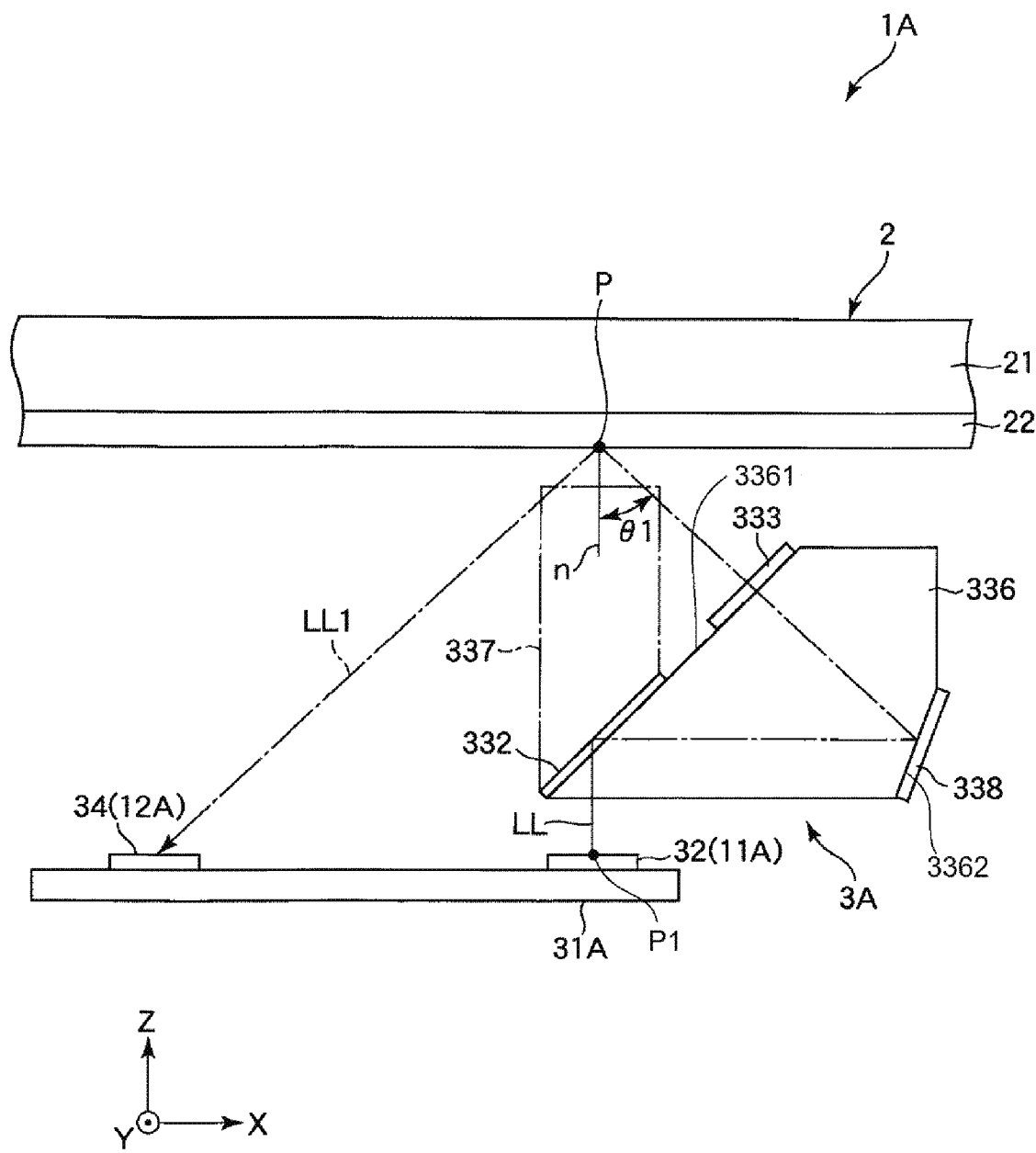
FIG. 9 is a cross-sectional view taken along line A-A in FIG. 7.
Figure 10:
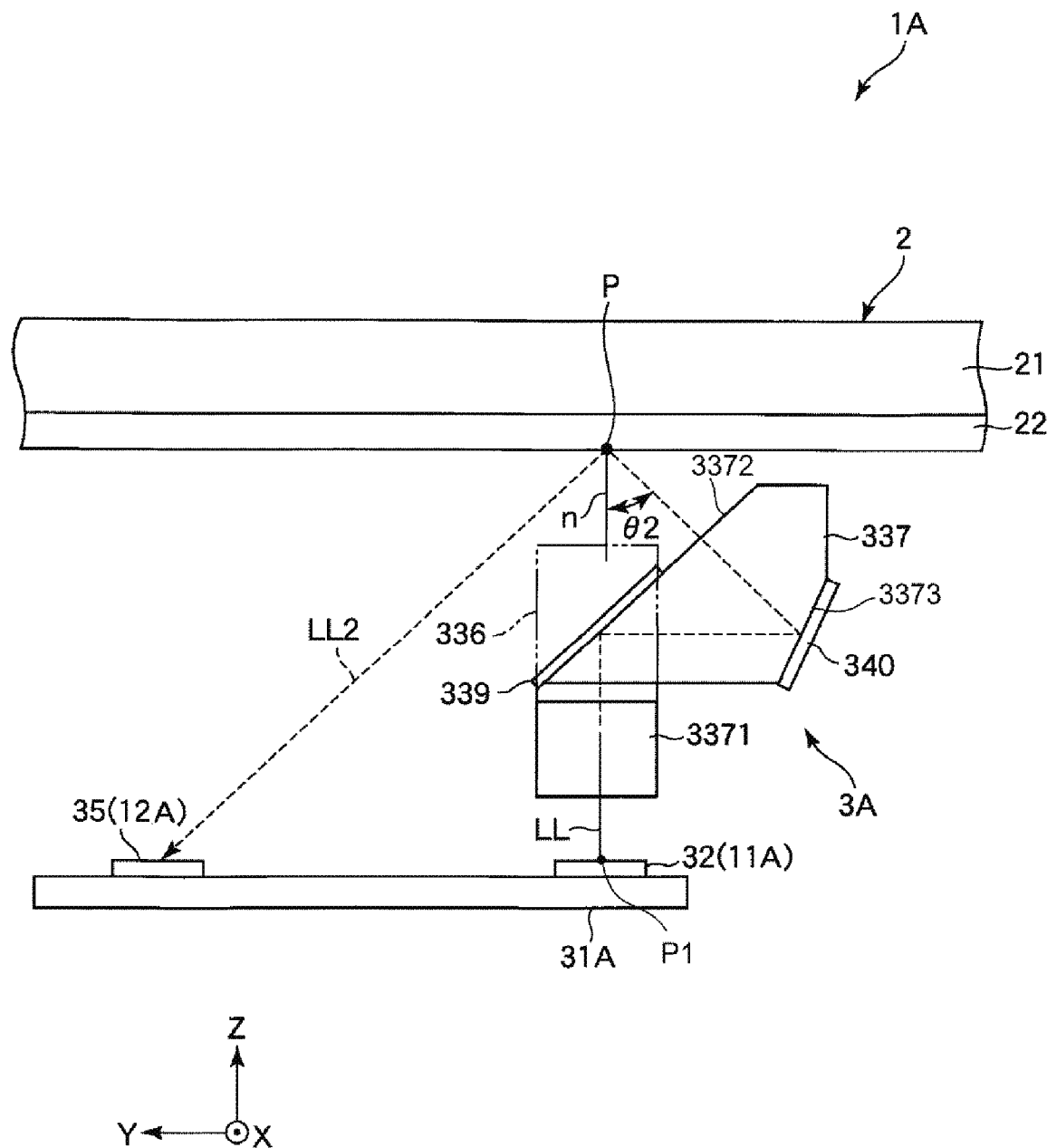
FIG. 10 is a cross-sectional view taken along line B-B in FIG. 7.

FIG. 6 is a diagram conceptually illustrating an encoder according to a second embodiment of the invention. FIG. 7 is a plan view (a view when seen from the Z-axis direction) of a sensor unit (light emitting portion, the light receiving portion, and the optical element unit) included in the encoder illustrated in FIG. 6. FIG. 8 is an exploded perspective view of an optical element unit included in the sensor unit illustrated in FIG. 7. FIG. 9 is a cross-sectional view taken along line A-A in FIG. 7. FIG. 10 is a cross-sectional view taken along line B-B in FIG. 7.

Hereinafter, although a second embodiment will be described, differences from the embodiment described above will be mainly described, and description of similar matters will be omitted. In FIGS. 6 to 10, the same reference numerals are given to the same configurations as those of the embodiment described above.

An encoder 1A illustrated in FIG. 6 differs from the first embodiment in the direction of incidence of first light LL1 and second light LL2 to the scale portion 22, and is constituted similarly to the encoder 1 of the first embodiment, except for the configuration (sensor unit 3A to be described later) regarding the difference in the incidence direction.

Specifically, as illustrated in FIG. 7, the sensor unit 3A included in the encoder 1A includes a substrate 31A, a light emitting element 32 and light receiving elements 34 and 35 that are provided on the substrate 31A, and an optical element unit 33A disposed between the light emitting element and the scale portion 22. Here, the light emitting element 32 constitutes a light emitting portion 11A that emits light LL. The light receiving elements 34 and 35 constitute a light receiving portion 12A which receives first light LL1 and second light LL2 from the scale portion 22 and outputs a signal corresponding to intensities of the received first light LL1 and second light LL2.

In the second embodiment, as illustrated in FIG. 7, the light receiving element 34 is disposed in the −X-axis direction side with respect to the light emitting element 32 and the light receiving element 35 is disposed in the +Y-axis direction side, in plan view. The optical element unit 33A is disposed in the +Z-axis direction side with respect to the light emitting element 32.

As illustrated in FIG. 8, the optical element unit 33A includes an optical member 336 provided with the reflective films 332 and 338, a phase difference plate 333 disposed on the optical member 336, and an optical member 337 provided with reflective films 339 and 340. Here, the optical members 336 and 337 joined via the reflective film 332 constitute the beam splitter 30 (see FIG. 6) that divides light LL into first light LL1 and second light LL2 within the XY plane.

The optical member 336 is made of, for example, an optical material such as a resin material, a glass material, a crystal material, or the like, and has optical transparency. As illustrated in FIG. 9, the optical member 336 has a surface 3361, which faces toward the scale portion 22 side (side opposite to substrate 31A) and is inclined at a predetermined angle (45° in the figure) with respect to the XY plane in the +X-axis direction side with respect to the light emitting element 32, and the reflective film 332 and the phase difference plate 333 are provided on the surface 3361. Also, a surface 3362 inclined at a predetermined angle with respect to the YZ plane is provided in the +X-axis direction side with respect to the reflective film 332 of the optical member 336, and the reflective film 338 is provided on the surface 3362.

In such an optical member 336, light LL from the light emitting element 32 is incident from the lower surface of the optical member 336, a portion of light LL is reflected by the reflective film 332 in the +X-axis direction to become first light LL1, and the remaining portion of light LL is transmitted through the reflective film 332 to become second light LL2 illustrated in FIG. 10. First light LL1 from the reflective film 332 is reflected by the reflective film 338 and emitted from the surface 3361. Then, first light LL1 passes through the phase difference plate 333, the polarization direction of first light LL1 which is linearly polarized is changed, and then first light LL1 is incident onto the irradiation point P of the scale portion 22 at the incident angle θ1. First light LL1 reflected by the scale portion 22 is received by the light receiving element 34.

The optical member 337 is made of, for example, an optical material such as a resin material, a glass material, a crystal material, or the like, and has optical transparency. As illustrated in FIG. 10, the optical member 337 has a surface 3371 along the surface 3361 of the optical member 336 described above in the +X-axis direction side with respect to the light emitting element 32, and the surface 3371 is joined to the surface 3361 via the reflective film 332 described above. The optical member 337 has a surface 3372 which faces toward the scale portion 22 side (side opposite to substrate 31A) and is inclined at a predetermined angle (45° in the figure) with respect to the XY plane and in the +Z-axis direction side with respect to the surface 3361, and a reflective film 339 is provided on the surface 3372. Furthermore, a surface 3373 inclined at a predetermined angle with respect to the XZ plane is provided on the −Y-axis direction side with respect to the reflective film 339 of the optical member 337, and a reflective film 340 is provided on surface 3373.

In such an optical member 337, second light LL2 transmitted through the reflective film 332 described above is incident onto the optical member 337 from the surface 3371. Then, second light LL2 is reflected by the reflective film 339 in the −Y-axis direction, thereafter, is reflected by the reflective film 340, and is emitted from the surface 3372. Then, second light LL2 is incident onto the irradiation point P of the scale portion 22 at the incident angle θ2. Second light LL2 reflected by the scale portion 22 is received by the light receiving element 35.

As described above, the encoder 1A includes the light emitting portion 11A that emits light LL, the optical element unit 33A that divides light LL into first light LL1 and second light LL2 and makes first light LL1 and second light LL2 incident onto the scale portion 22, and the light receiving portion 12A which receives first light LL1 and second light LL2 from the scale portion 22 and outputs a signal corresponding to intensities of the received first light LL1 and second light LL2. Here, first light LL1 and second light LL2 at least partially overlap each other within the plane of the scale portion 22. With this, it is possible to improve detection accuracy of the encoder 1A.

Also, in the encoder 1A, when the incident angle of first light LL1 with respect to the scale portion 22 is set as θ1[°] and the incident angle of second light LL2 with respect to the scale portion 22 is set as θ2[°], a relationship of θ1=θ2 is satisfied. A relationship of θ1≠θ2 may also be satisfied.

Also, when an angle formed between the incident direction of first light LL1 and the incident direction of second light LL2 to the scale portion 22 is set as θ3 in plan view, the relationship of θ3<180° (θ3=90° in the second embodiment) is satisfied. With this, it is possible to miniaturize the optical element unit 33A (compact installation by disposing a plurality of members constituting the optical element unit 33A close to each other). The invention is not limited to the case of θ3=0°. The invention is not limited to the case of θ3=90°, but θ3 may be set to an angle smaller or larger than 90°. For example, it is possible to set θ3 to any angle within a range smaller than 180° by appropriately changing the shape, the disposition, and the like of the optical members 336 and 337 or appropriately adding other optical components. According to the second embodiment as described above, detection accuracy can also be improved.

Modification Example

Figure 11:
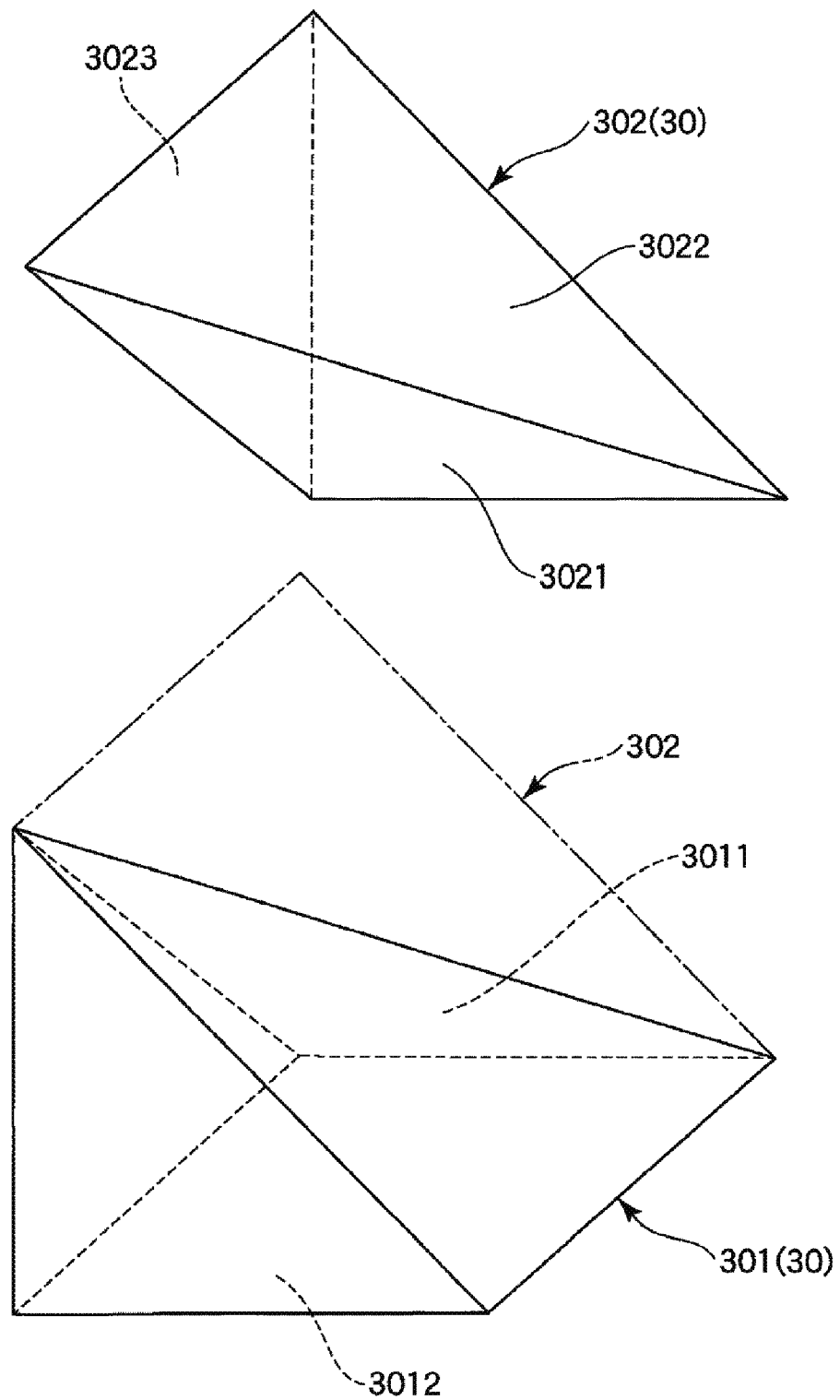
FIG. 11 is an exploded perspective view for explaining a modification example of a beam splitter of the optical element unit included in the encoder illustrated in FIG. 6.
Figure 12:
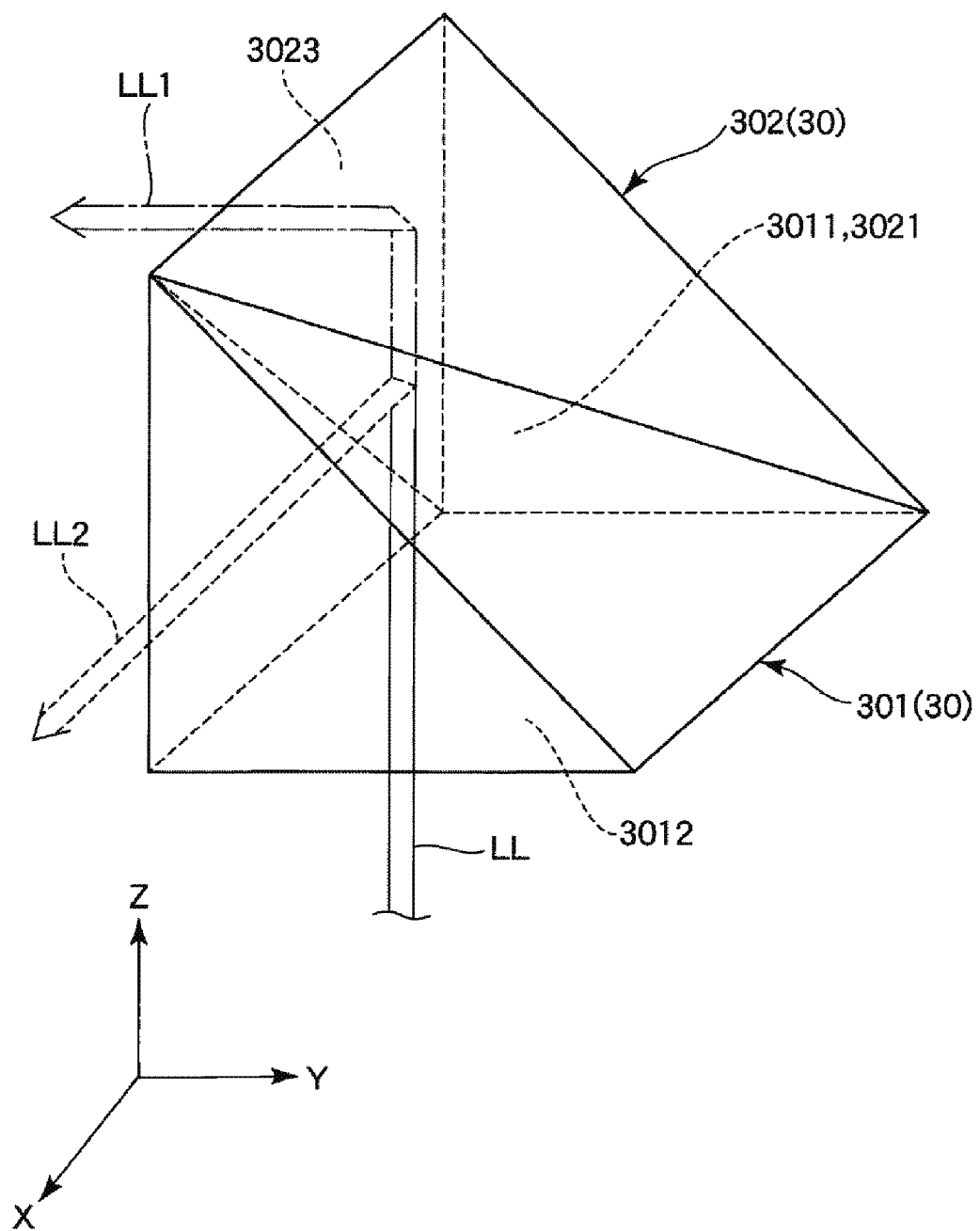
FIG. 12 is a perspective view for explaining an operation of the beam splitter illustrated in FIG. 11.

FIG. 11 is an exploded perspective view for explaining a modification example of the beam splitter of the optical element unit included in the encoder illustrated in FIG. 6. FIG. 12 is a perspective view for explaining the operation of the beam splitter illustrated in FIG. 11.

The beam splitter 30 can also be constituted by using the optical members 301 and 302 as illustrated in FIGS. 11 and 12. The optical member 301 is a pentahedron and the optical member 302 is a tetrahedron. The surfaces 3011 and 3021 of the optical members 301 and 302 are joined to each other via a semi-reflective film (not illustrated), and the overall shape of the joined surfaces is a triangular pillar shape in which the bottom surface thereof forms a right-angled isosceles triangle and each of two side surfaces corresponding to sides other than the bottom side of the right-angled isosceles triangle has a square shape.

Here, one side surface (surface including surface 3012 of the optical member 301) of the two side surfaces is along the XY plane and the other side surface (surface including surface 3023 of the optical member 302) is along the YZ plane. The joining surfaces (surfaces 3011 and 3021 described above) between the optical member 301 and the optical member 302 are inclined by 45° around the X-axis with respect to the XY plane. The side surfaces (surface including the surface 3022 of the optical member 302) corresponding to the bottom sides of the right-angled isosceles triangles of the optical members 301 and 302 are inclined by 45° around the Y-axis with respect to the XY plane.

In such a beam splitter 30, a portion of light LL is reflected from the joining surfaces (surfaces 3011 and 3021) between the optical member 301 and the optical member 302 in the −Y-axis direction to become second light LL2, and the remaining portion of light LL is transmitted through the joining surfaces to become first light LL1. First light LL1 from the joining surface is reflected from the side surface (surface 3022) corresponding to the bottom side of the right-angled isosceles triangle described above of the optical member 301 in the +X-axis direction and is emitted from the surface 3023.

Third Embodiment

Figure 13:
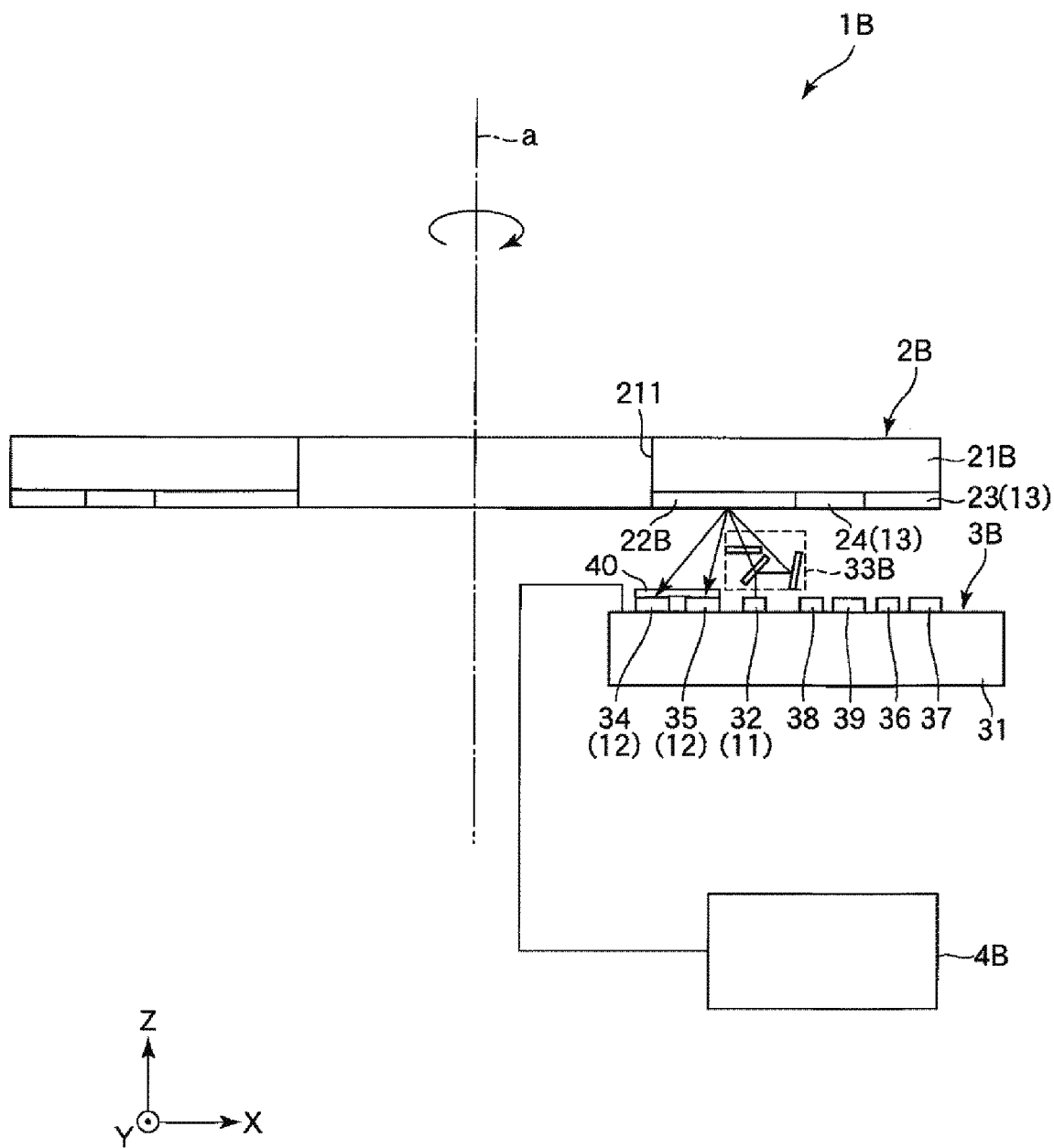
FIG. 13 is a cross-sectional view (a view cut along the XZ plane) schematically illustrating an encoder according to a third embodiment of the invention.
Figure 14:
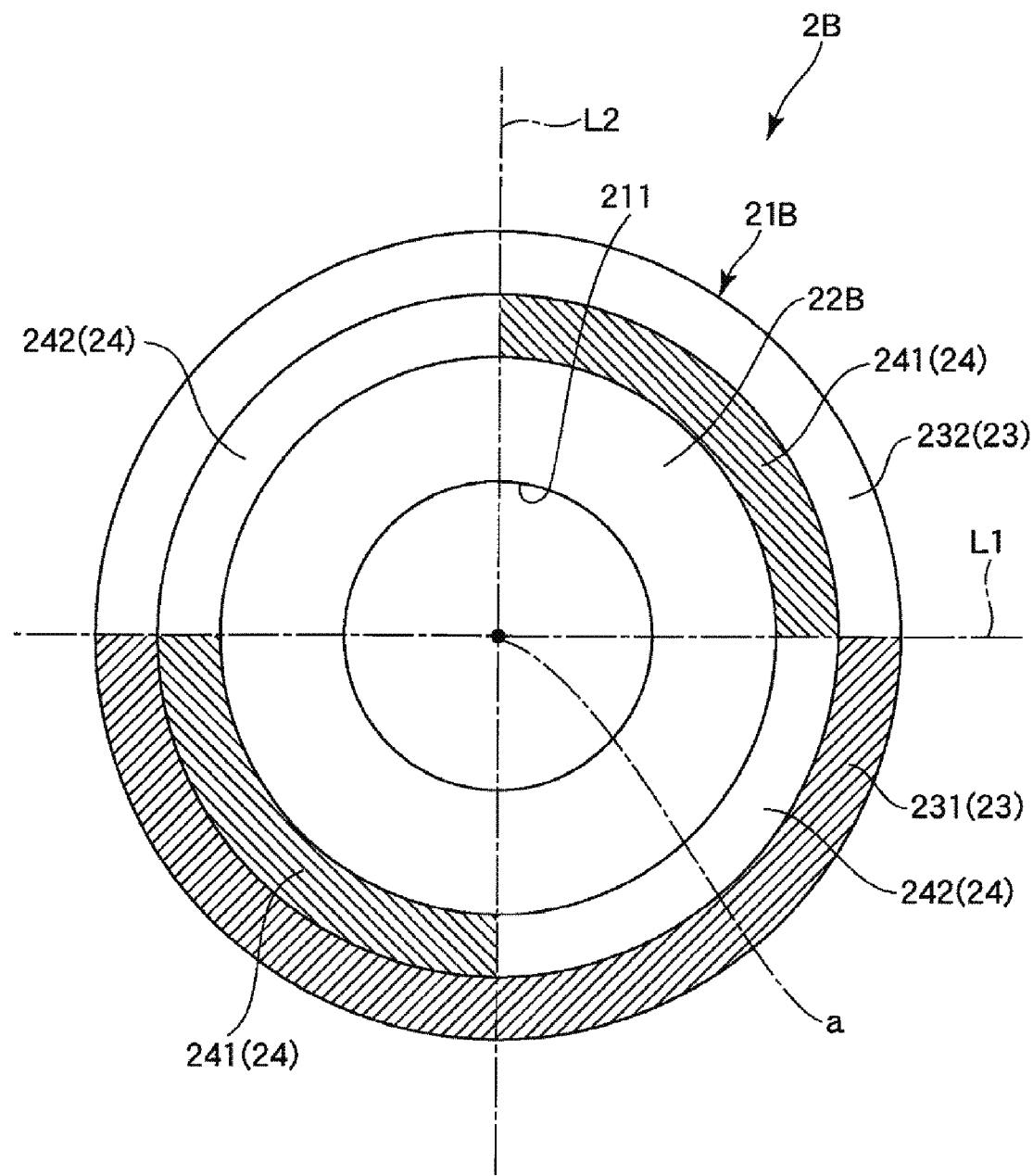
FIG. 14 is a plan view (a view when seen from the Z-axis direction) of an optical scale included in the encoder illustrated in FIG. 13.
Figure 15:
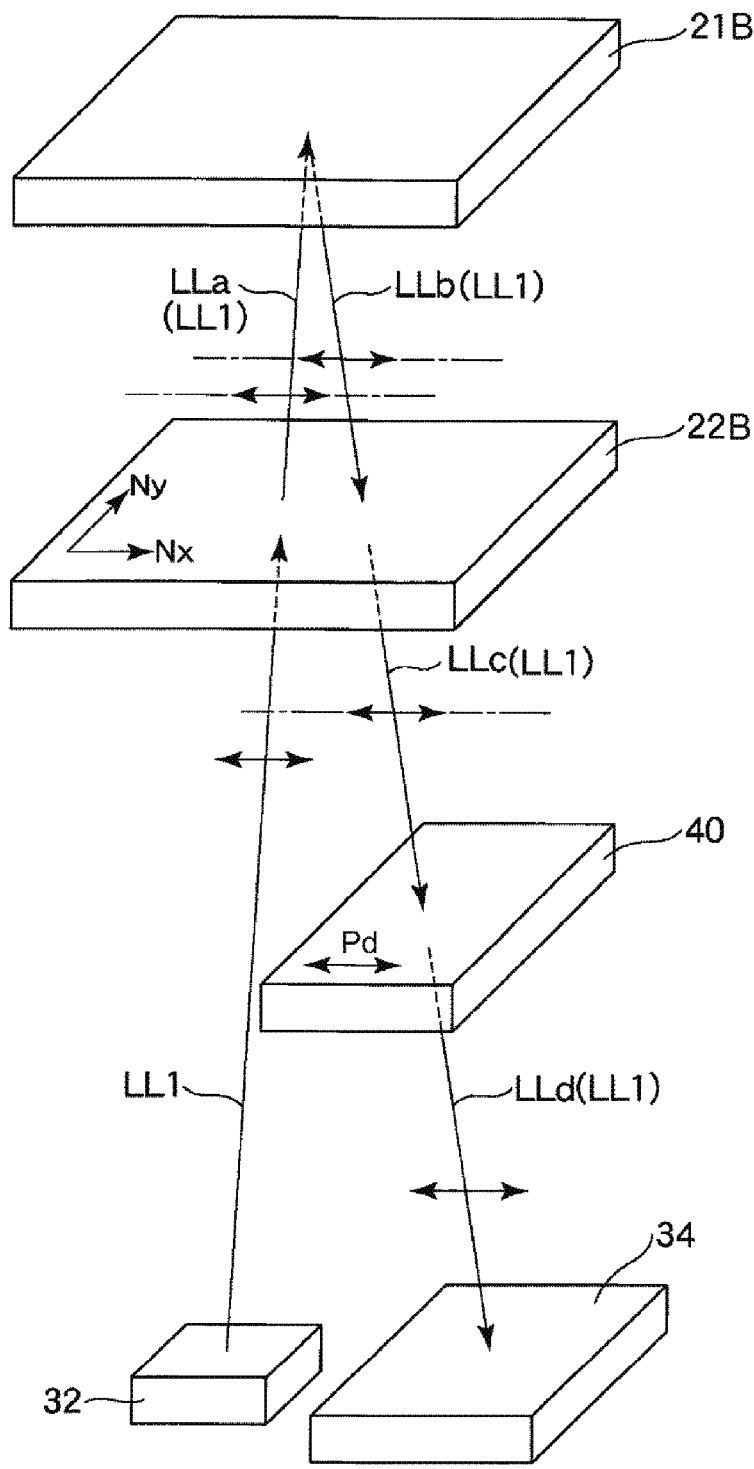
FIG. 15 is a conceptual diagram for explaining a polarization state of light received by a light receiving portion when a slow axis of a phase difference plate is parallel to the direction of linearly polarized light from a light emitting portion.
Figure 16:
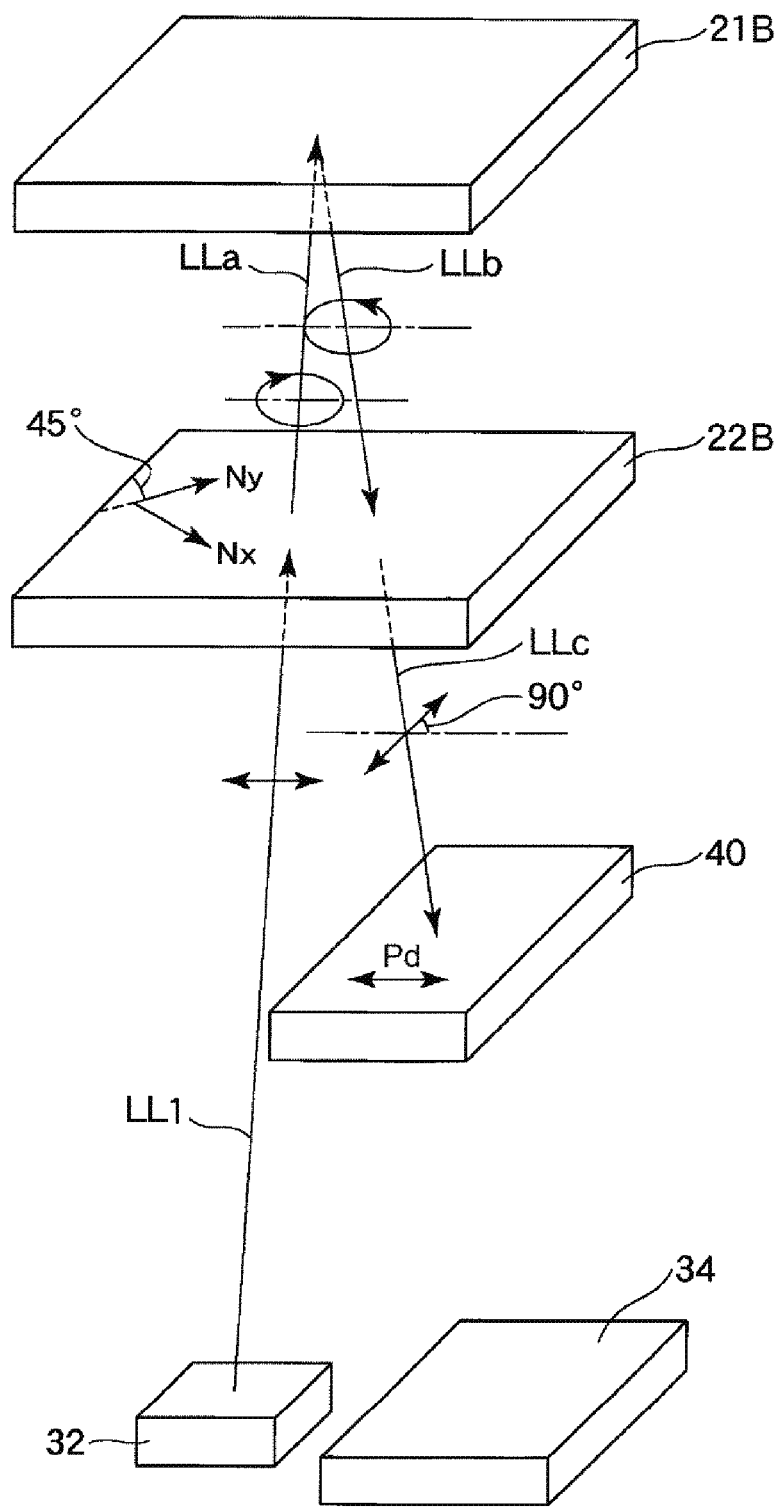
FIG. 16 is a conceptual diagram for explaining the polarization state of light received by the light receiving portion when the slow axis of the phase difference plate is inclined by 90° with respect to the direction of linearly polarized light from the light emitting portion.
Figure 17:
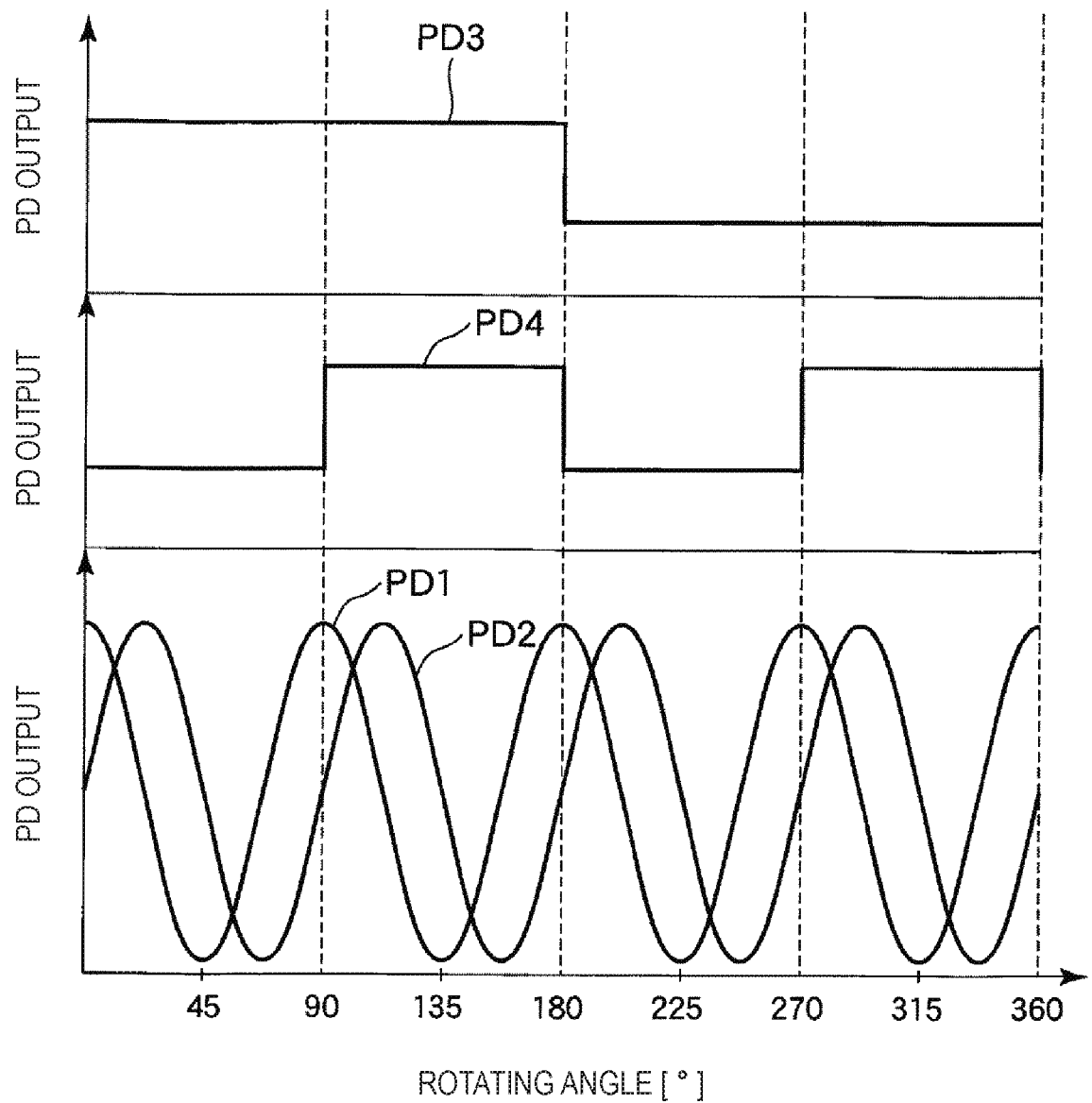
FIG. 17 is a graph illustrating a relationship between a rotation angle of the optical scale of the encoder illustrated in FIG. 13 and a current value (PD output) generated in the light receiving portion.

FIG. 13 is a cross-sectional view (a view cut along the XZ plane) schematically illustrating an encoder according to a third embodiment of the invention. FIG. 14 is a plan view (a view when seen from the Z-axis direction) of an optical scale included in the encoder illustrated in FIG. 13. FIG. 15 is a conceptual diagram for explaining a polarization state of light received by a light receiving portion when a slow axis of a phase difference plate is parallel to the direction of linearly polarized light from a light emitting portion. FIG. 16 is a conceptual diagram for explaining the polarization state of light received by the light receiving portion when the slow axis of the phase difference plate is inclined by 90° with respect to a direction of linearly polarized light from the light emitting portion. FIG. 17 is a graph illustrating a relationship between a rotation angle of the optical scale of the encoder illustrated in FIG. 13 and a current value (PD output) generated at the light receiving portion.

Hereinafter, a third embodiment will be described, but differences from the embodiments described above will be mainly described, and description of similar matters will be omitted. In FIGS. 13 to 17, the same reference numerals are given to the same configurations as in the embodiments described above.

An encoder 1B illustrated in FIG. 13 includes an optical scale 2B which rotates around a rotation axis a, a sensor unit 3B which is fixed and installed to face to the optical scale 2B, and an operation portion 4B which is electrically connected to the sensor unit 3B.

The optical scale 2B includes a reflective plate 21B, a scale portion 22B provided on one surface (lower surface in FIG. 13) of the reflective plate 21B, the 180° determination track 23, and a 90° determination track 24.

The reflective plate 21B has reflectivity to light from the light emitting elements 32, 36, and 38. The constituent material of the reflective plate 21B is not particularly limited and, for example, a metal material, a semiconductor material, a glass material, a resin material, and the like are included. The reflective plate 21B may be constituted by combining two or more different materials, and, for example, at least two of the constituent material of a portion provided with the scale portion 22B, the constituent material of a portion provided with the 180° determination track 23, and the constituent material of a portion provided with the 90° determination track 24 may be different from each other. It suffices that the surface of a side at which the scale portion 22B of the reflective plate 21B, the 180° determination track 23, and the 90° determination track 24 are provided may have light reflectivity and the other surface of the side may not have light reflectivity.

On one surface of such a reflective plate 21B, the scale portion 22B, the 90° determination track 24, and the 180° determination track 23 are disposed side by side in this order from the center side of the reflective plate 21B toward the outer circumferential side thereof.

The scale portion 22B is constituted with a phase difference plate and is joined to one surface of the reflective plate 21B by an optical adhesive or the like. The scale portion 22B is an optical element that generates a phase difference (optical path difference) corresponding to ¼ wavelength in two orthogonal polarization components, that is, a λ/4 phase difference plate. The constituent material of the scale portion 22B (phase difference plate) is not particularly limited and, for example, birefringent materials such as quartz crystal, $MgF_2$ crystal, and birefringent polymer are included. The scale portion 22B can be manufactured in the same manner as a known phase difference plate. The phase difference generated by the scale portion 22B may be (2n+1)×λ/4. However, n is an integer of 0 or more. The scale portion 22B may be constituted by combining a plurality of phase difference plates so as to generate such a phase difference.

In plan view, the 90° determination track 24 is constituted with two areas 241 (upper right side and lower left side in FIG. 14) facing each other and the remaining two areas 242 (lower right side and upper left side in FIG. 14) facing each other, among the four areas divided by line segments L1 and L2 which are orthogonal to each other through the rotation axis a, in plan view. A combination of the areas 231, 232, 241, and 242 is a 90° determination pattern 13 which is an identification pattern different every 90° in the circumferential direction of the optical scale 2B.

Here, for example, a thin film having light antireflection property is provided in each of the areas 231 and 241, whereas the thin film is not provided in each of the areas 232 and 242. The thin film is not particularly limited but, for example, a black coating film, a dielectric multilayer film, and the like are included as the thin film. In a case where the encoder 1B is used as an incremental encoder, the 180° determination track 23 and the 90° determination track 24 can be omitted.

The sensor unit 3B includes the substrate 31, the light emitting elements 32, 36, and 38 and light receiving elements 34, 35, 37, and 39 provided on the surface of the optical scale 2 side of the substrate 31, an optical element unit 33B disposed between the light emitting element 32 and the scale portion 22, and a polarizing plate 40 disposed on the light receiving elements 34 and 35.

The optical element unit 33B has a function of dividing light LL into first light LL1 and second light LL2, deviating the polarization direction of one of first light LL1 and second light LL2 by 22.5° with respect to the other thereof, and making it incident on the scale portion 22B. In the optical element unit 33 of the first embodiment described above, the direction of the phase difference plate 333 may be changed in the optical element unit 33B so that the polarization direction of one of first light LL1 and second light LL2 is deviated by 22.5° with respect to the polarization direction of the other thereof.

The light emitting element 38 is, for example, a surface emitting laser or a light emitting diode, and light to be emitted may or may not be polarized. The light emitting element 38 irradiates light toward the 90° determination track 24. The light receiving element 39 is, for example, a photodiode using GaAs or Si, and has a function of receiving light reflected by the 90° determination track 24 and outputting a current corresponding to intensity of the received light as a detection signal.

The polarizing plate 40 is disposed between the light receiving elements 34 and 35 and the scale portion 22B. The polarizing plate 40 can be constituted similarly to the scale portion 22 of the optical scale 2 of the first embodiment described above.

Hereinafter, a detection principle of the encoder 1B will be described in detail with reference to FIGS. 15 and 16. FIGS. 15 and 16 representatively illustrate the operation on first light LL1.

As illustrated in FIG. 15, first light LL1 which is linearly polarized is incident on the scale portion 22B and is emitted from the scale portion 22B as light LLa being in a polarization state corresponding to the direction of the slow axis Nx of the scale portion 22B (phase difference plate). Light LLa is reflected by the reflective plate 21B toward the scale portion 22B to become light LLb. Light LLb is emitted from the scale portion 22B as light LLc being in a polarization state corresponding to the direction of the slow axis Nx of the scale portion 22B. Light LLc is incident on the polarizing plate 40, and only the directional component along a polarization axis direction Pd of the polarizing plate 40 is transmitted through the polarizing plate 40. With this, linearly polarized light LLd in the direction along the polarization axis direction Pd from the polarizing plate 40 is received by the light receiving element 34.

FIG. 15 illustrates a state in which the slow axis Nx of the scale portion 22B is parallel to the direction of the linearly polarized light of light LL (vibration direction of electric field), and in this state, all of light LLa, light LLb, light LLc, and light LLd become linearly polarized light in the same direction as first light LL1. Here, light LLc is hardly absorbed by the polarizing plate 40, passes through the polarizing plate 40, and becomes light LLd. An azimuth in which the speed of light traveling through a phase difference plate which constitutes the scale portion 22B is fast (refractive index is minimized) is referred to as a "fast axis Ny" and in contrast, an azimuth in which the speed of light traveling through the phase difference plate is slow (refractive index is maximized) is referred to as a "slow axis Nx".

As illustrated in FIG. 16, in a state where the slow axis Nx of the scale portion 22B is inclined (rotated) by 45° with respect to the direction of the linearly polarized light of first light LL1, light LLa becomes circularly polarized light. Light LLb becomes circularly polarized light having a direction reversed from light Lla. For that reason, light LLc becomes linearly polarized light in the vibration direction which is line-symmetrical with respect to the slow axis Nx, that is, linearly polarized light in a direction rotated by 90° with respect to the direction of linearly polarized light of first light LL1. Accordingly, the directional component (that is, all) other than the direction along the polarization axis direction Pd of light LLc is absorbed by the polarizing plate 40, such that a light amount of light LLd becomes zero.

According to such a principle, a light amount of light LLd periodically changes according to an inclination angle of the slow axis Nx of the scale portion 22B with respect to the direction of the linearly polarized light of first light LL1. Accordingly, as illustrated in FIG. 17, the signal (PD1 in FIG. 17) output from the light receiving elements 34 and 35 has a rotation angle of 90° of the optical scale 2B as one cycle and changes sinusoidally according to the rotating angle of the optical scale 2B. However, as described above, since the polarization directions of first light LL1 and second light LL2 are different from each other, the phases of the signals from the light receiving elements 34 and 35 are deviated by 22.5° according to deviation in the polarization direction.

By using one of the signals as the A phase signal and the other thereof as the B phase signal, it is possible to determine a rotating angle within each of a range in which a rotating angle of the optical scale 2B is 0° to 90°, a range in which the rotating angle is 90° to 180°, a range in which the rotating angle is 180° to 270°, and a range in which the rotation angle is 270° to 360°.

As described above, since the reflectances of the area 241 and the area 242 of the 90° determination track 24 are different from each other, a signal (PD4 in FIG. 17) output from the light receiving element 39 changes in a binary manner. Here, the signal from the light receiving element 39 has different values between the ranges of 0° to 90° and 180° to 270° and the ranges of 90° to 180° and the range of 270° to 360°.

Also, as described above, since the reflectances of the area 231 and the area 232 of the 180° determination track 23 are different from each other, a signal (PD3 in FIG. 17) output from the light receiving element 37 changes in a binary manner. Here, the signal from the light receiving element 37 has different values between the range of 0° to 180° and the range of 180° to 360°.

It is possible to determine in which range of the range of 0° to 90°, the ranges of 90° to 180°, the range of 180° to 270°, the range of 270° to 360° the signals from the light receiving elements 37 and 39 fall.

As described above, the encoder 1B includes the optical scale 2B including the scale portion 22B constituted with the phase difference plate, the light emitting portion emitting light LL, the optical element unit 33B that divides light LL into first light LL1 and second light LL2 and makes light LL incident toward the scale portion 22B, the light receiving portion 12 which receives first light LL1 and second light LL2 from the scale portion 22B and outputs a signal corresponding to intensities of the received first light LL1 and second light LL2. In particular, first light LL1 and second light LL2 at least partially overlap each other within the plane of the scale portion 22B. Even with such an encoder 1B, it is possible to improve detection accuracy, similarly to the encoder 1 of the first embodiment described above.

Here, the optical scale 2B has the reflective plate 21B disposed in the side opposite to the light emitting portion 11 with respect to the scale portion 22B. With this, it is possible to realize the reflection type optical encoder 1B. In particular, when such a reflective plate 21B is used, there is an advantage that the effect of improving detection accuracy is high in a case where the scale portion 22B as in the second embodiment is constituted with a phase difference plate.

The optical scale 2B has the identification pattern 13 which is provided along the circumferential direction around the rotation axis a (center axis) of the optical scale 2B and is different every 90° in the circumferential direction. With this, it is possible to realize the absolute type encoder 1B.

2. Robot

Figure 18:
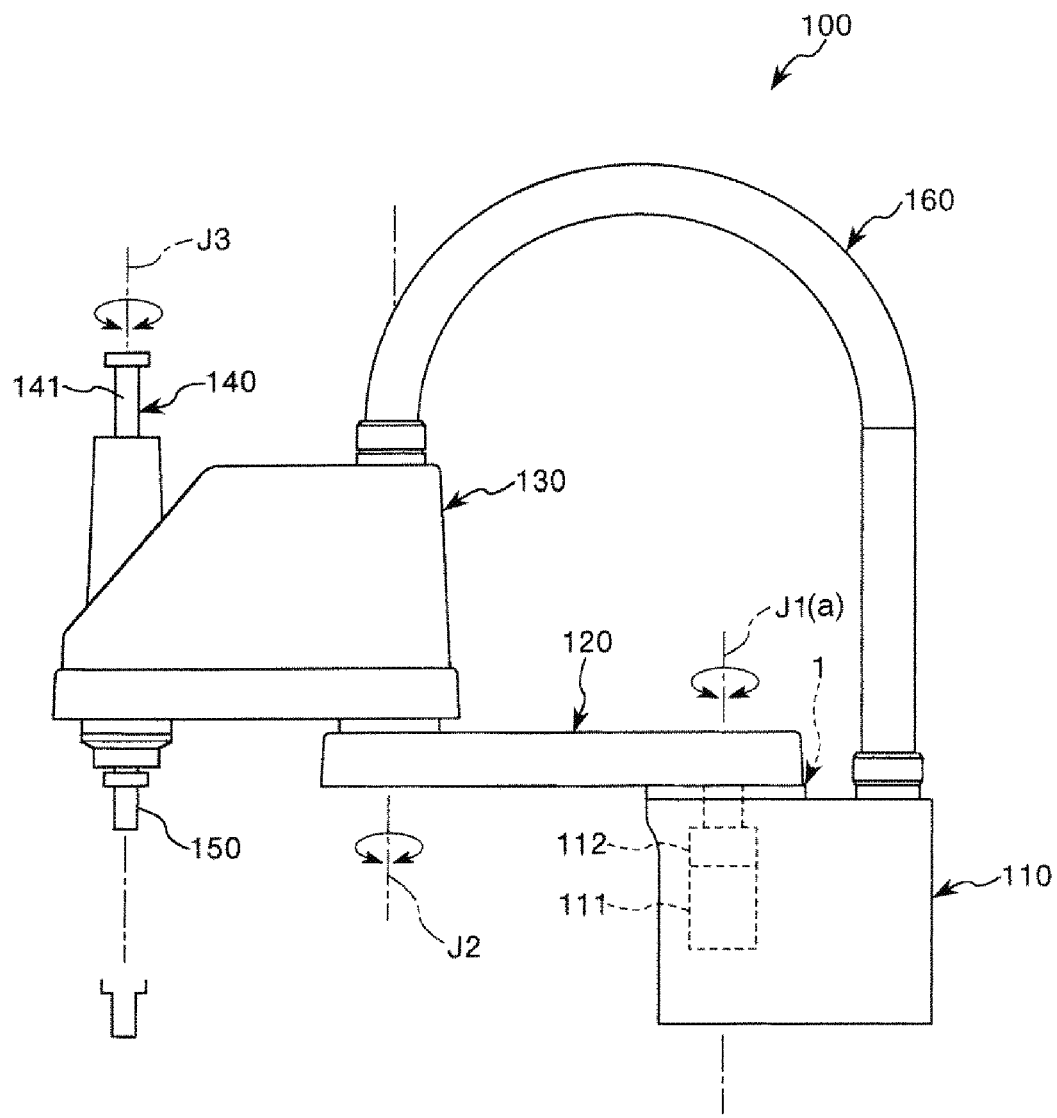
FIG. 18 is a side view illustrating an embodiment of a robot according to the invention.

FIG. 18 is a side view illustrating an embodiment of a robot according to the invention. In the following description, for convenience of description, the upper side in FIG. 18 is referred to as "up" and the lower side is referred to as "down". Also, a base side in FIG. 18 is referred to as a "base end" and a side (end effector side) opposite to the base side is referred to as a "tip end". Also, the up-and-down direction in FIG. 18 is defined as a "vertical direction" and the left-and-right direction is defined as a "horizontal direction".

A robot 100 illustrated in FIG. 18 is a so-called horizontal articulated robot (SCARA robot) and, for example, may be used in a manufacturing process or the like for manufacturing a precision instrument or the like, and may grasp and transport precision instruments, parts, and the like.

As illustrated in FIG. 18, the robot 100 includes a base 110, a first arm 120, a second arm 130, a working head 140, an end effector 150, and a wiring routing portion 160. Hereinafter, each of components of the robot 100 will be briefly described in order.

The base 110 is, for example, fixed to a floor surface (not illustrated) by a bolt or the like. A first arm 120 is connected to an upper end portion of the base 110. The first arm 120 is rotatable around a rotation axis J1 (rotation axis a) which is a first axis along the vertical direction with respect to the base 110.

In the base 110, a motor 111 which is a first motor for generating a driving force for rotating the first arm 120 and a reduction gear 112 which is a first reduction gear for reducing the driving force of the motor 111 are installed. An input shaft of the reduction gear 112 is connected to a rotation shaft of the motor 111 and an output shaft of the reduction gear 112 is connected to the first arm 120. For that reason, when the motor 111 is driven and a driving force thereof is transmitted to the first arm 120 via the reduction gear 112, the first arm 120 rotates in the horizontal plane around a rotation axis J1 with respect to the base 110. The base 110 and the first arm 120 are provided with the encoder 1 as a first encoder for detecting the rotation state (rotating state) of the first arm 120 with respect to the base 110.

A second arm 130 is connected to a tip end portion of the first arm 120. The second arm 130 is rotatable around a second axis J2 along a vertical direction with respect to the first arm 120. Although not illustrated, a second motor which generates a driving force for rotating the second arm 130 and a second reduction gear which reduces the driving force of the second arm 130 are installed in the second arm 130. Then, as the driving force of the second motor is transmitted to the second arm 130 via the second reduction gear, the second arm 130 rotates about the second axis J2 in the horizontal plane with respect to the first arm 120. Although not illustrated, the second motor is provided with a second encoder for detecting the rotation state of the second arm 130 with respect to the first arm 120.

At the tip end portion of the second arm 130, the working head 140 is disposed. The working head 140 has a spline shaft 141 inserted through a spline nut and a ball screw nut (none of which illustrated) coaxially disposed at the tip end portion of the second arm 130. The spline shaft 141 is rotatable around the axis J3 with respect to the second arm 130 and is movable (elevatable) in the up-and-down direction.

Although not illustrated, a rotating motor and an elevating motor are disposed in the second arm 130. The driving force of the rotating motor is transmitted to the spline nut by a driving force transmission mechanism (not illustrated), and when the spline nut rotates forwardly and backwardly, the spline shaft 141 rotates forwardly and backwardly around the axis J3 along the vertical direction. Although not illustrated, the rotating motor is provided with a third encoder for detecting the rotation state of the spline shaft 141 with respect to the second arm 130.

On the other hand, the driving force of the elevating motor is transmitted to the ball screw nut by a driving force transmission mechanism (not illustrated), and when the ball screw nut rotates forwardly and backwardly, the spline shaft 141 moves up and down. The elevating motor is provided with a fourth encoder for detecting a movement amount of the spline shaft 141 with respect to the second arm 130.

The end effector 150 is connected to a tip end portion (lower end portion) of the spline shaft 141. The end effector 150 is not particularly limited, and includes an end effector that grasps an object to be transported, an end effector that processes a workpiece, and the like.

A plurality of wirings, which are connected to electronic components (for example, the second motor, the rotating motor, the elevating motor, and the second to fourth encoders) disposed in the second arm 130, pass through the inside of the tubular wiring routing portion 160 connecting the second arm 130 and the base 110, and are routed to the inside of the base 110. Furthermore, the plurality of wirings, together with the wirings which are connected to the motor 111 and the encoder 1, are routed to a control device (not illustrated), which is installed outside the base 110 and comprehensively controls the robot 100, by being gathered within the base 110.

As described above, the robot 100 includes the encoder 1 (or encoder 1A or 1B). According to such a robot 100, it is possible to improve detection accuracy of the encoder 1 (or encoder 1A or 1B). For that reason, for example, the detection result of the encoder 1 (or encoder 1A or 1B) is used so as to make it possible to perform operation control of the robot 100 with high accuracy. In the robot 100, at least one of the second to fourth encoders may be the same as the encoder 1 (or encoder 1A or 1B).

3. Printer

Figure 19:
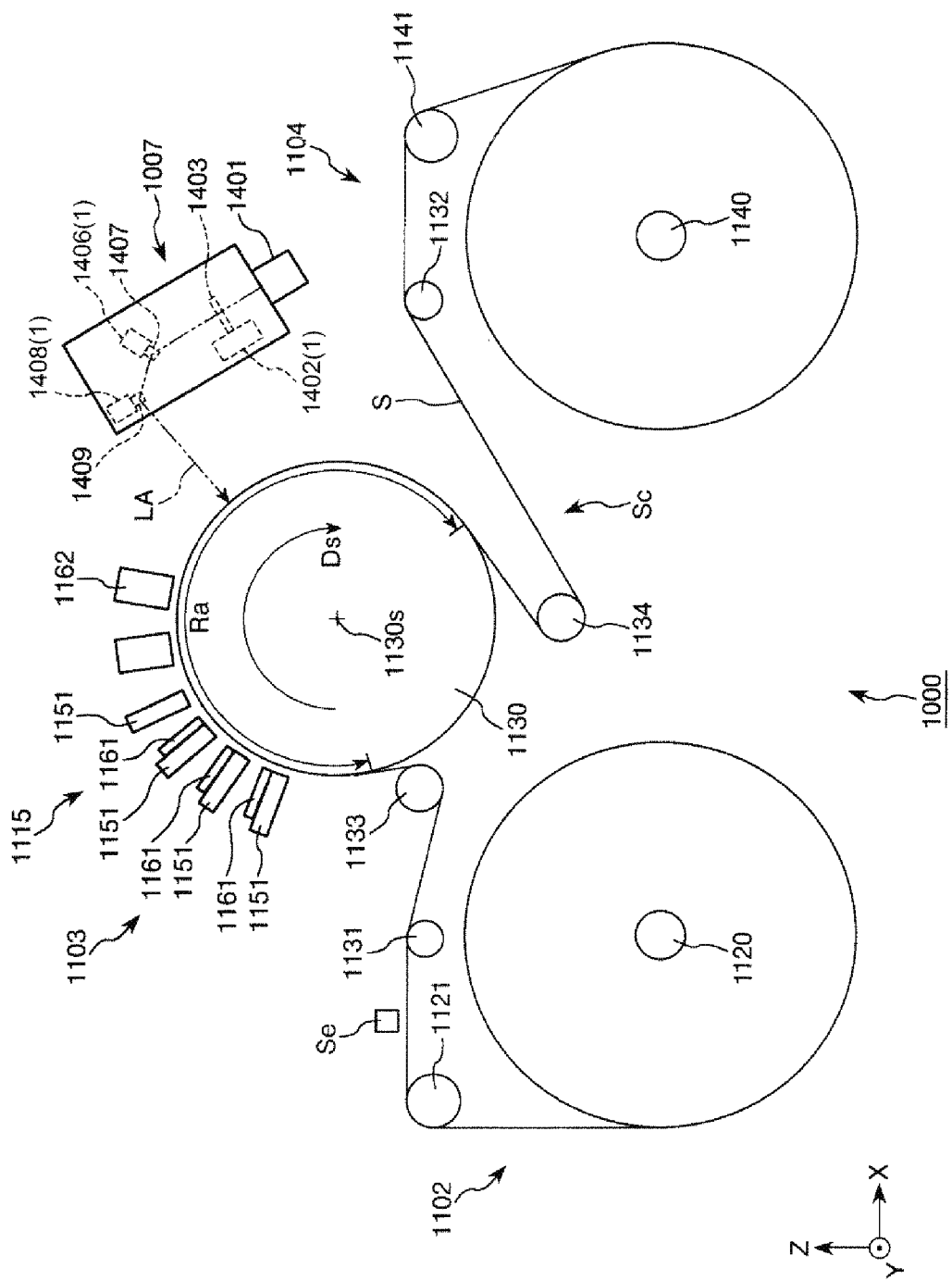
FIG. 19 is a side view illustrating an embodiment of a printer according to the invention.

FIG. 19 is a side view illustrating an embodiment of a printer according to the invention.

A printer 1000 illustrated in FIG. 19 is a label printing apparatus provided with a drum-shaped platen. In this printer 1000, one sheet S (web) such as a paper type or a film type, of which both ends of the sheet S is wound in a roll form around a feeding shaft 1120 and a winding shaft 1140, as a recording medium, is stretched between the feeding shaft 1120 and the winding shaft 1140 and is transported from the feeding shaft 1120 to the winding shaft 1140 along a transportation path Sc stretched in this manner. The printer 1000 is constituted to record (form) an image on the sheet S by ejecting a functional liquid onto the sheet S transported along the transportation path Sc.

As a schematic configuration, the printer 1000 is constituted to include a feeding portion 1102 that feeds the sheet S from the feeding shaft 1120, a process unit 1103 that records an image on the sheet S fed from the feeding portion 1102, a laser scanner device 1007 that cuts out the sheet S on which an image is recorded by the process unit 1103, and a winding portion 1104 that winds the sheet S around the winding shaft 1140.

The feeding portion 1102 includes a feeding shaft 1120 around which the end of the sheet S is wound and a driven roller 1121 around which the sheet S pulled out from the feeding shaft 1120 is wound.

The process unit 1103 performs appropriate processing on the sheet S by a recording head 1151 or the like disposed in a head unit 1115 disposed along the outer circumferential surface of the platen drum 1130 while supporting the sheet S fed from the feeding portion 1102 by a platen drum 1130 as a support unit, and record the image on the sheet S.

The platen drum 1130 is a cylindrical drum rotatably supported around a drum shaft 1130s by a support mechanism (not illustrated), and in the platen drum 1130, the sheet S transported from the feeding portion 1102 to the winding portion 1104 is wound from the back surface (surface opposite to the recording surface) side. The platen drum 1130 supports the sheet S from the back surface side over a range Ra in the circumferential direction while being driven and rotated in a transportation direction Ds of the sheet S under a frictional force between the platen drum 1130 and the sheet S. Here, in the process unit 1103, driven rollers 1133 and 1134 for folding the sheet S are provided on both sides of a winding portion to the platen drum 1130. Driven rollers 1121 and 1131 and a sensor Se are provided between the feeding shaft 1120 and the driven roller 1133, and driven rollers 1132 and 1141 are provided between the winding shaft 1140 and the driven roller 1134.

The process unit 1103 includes a head unit 1115, and four recording heads 1151 corresponding to yellow, cyan, magenta, and black are provided in the head unit 1115. Each of the recording heads 1151 faces the front surface of the sheet S wound around the platen drum 1130 with a slight clearance (platen gap) and ejects a functional liquid of a corresponding color from the nozzles by an ink jet method. Then, each recording head 1151 ejects the functional liquid onto the sheet S transported in the transportation direction Ds to form a color image on the front surface of the sheet S.

Here, ultraviolet (UV) ink (photocurable ink) which is cured by being irradiated with ultraviolet light (light) is used as the functional liquid. For that reason, in the head unit 1115 of the process unit 1103, a first UV light source 1161 (light irradiation unit) is provided between the plurality of recording heads 1151 in order to temporarily cure UV ink to be fixed on the sheet S. A second UV light source 1162 as a curing portion for main curing is provided on the downstream side in the transportation direction Ds with respect to the plurality of recording heads 1151 (head unit 1115).

The laser scanner device 1007 is provided so as to partially cut out or divide the sheet S on which an image is recorded. The sheet S which is a workpiece is irradiated with laser light which is oscillated by a laser oscillator 1401 of the laser scanner device 1007 and is passed through the first lens 1403, the first mirror 1407, the second mirror 1409, and the like of which the position or rotational position (angle) is controlled by driving devices 1402, 1406, and 1408 including the encoder 1. As such, an irradiation position of laser beam LA with which the sheet S is irradiated is controlled by each of the driving devices 1402, 1406, and 1408, and a desired position on the sheet S can be irradiated with the laser light LA. In the sheet S, a portion irradiated with the laser light LA is fused and partially cut out or divided.

As described above, the printer 1000 includes the encoder 1 (or encoder 1A or 1B). According to such a printer 1000, it is possible to improve detection accuracy of the encoder 1 (or encoder 1A or 1B). For that reason, for example, it is possible to high accurately perform operation control of the printer 1000 using the detection result of such an encoder 1 (or encoder 1A or 1B).

Although the encoder, the printer, and the robot according to the invention have been described based on preferred embodiments illustrated in the drawings, the invention is not limited thereto, and the configuration of each part can be replaced with any configuration having the same function. Further, any other constituent may be added.

An installation point of the encoder is not limited to a joint part between the base and the first arm, but may be a joint part of any two arms that rotate relative to each other. Also, the installation point of the encoder is not limited to the joint part of the robot.

In the embodiment described above, the number of robot arms is one, but the number of robot arms is not limited thereto, and may be, for example, two or more. That is, the robot according to the invention may be a multi-arm robot, for example, a double arm robot.

In the embodiment described above, the number of arms of the robot is two, but the number of arms is not limited thereto, and may be, for example, one or three or more.

In the embodiment described above, the installation point of the robot according to the invention is not limited to the floor surface, but may be, for example, a ceiling surface, a side wall surface, or the like. The robot according to the invention is not limited to one fixedly installed on a structure such as a building, but may be, for example, a legged walking (running) robot having legs.

In the embodiment described above, a horizontally articulated robot has been described as an example of the robot according to the invention, but the robot of the invention may be a robot of another type such as a vertically articulated robot as long as it has two members which rotate relative to each other.

The encoder according to the invention is not limited to be used for the robot and the printer described above, and can be used for various devices having a rotation axis.

The entire disclosure of Japanese Patent Application No. 2017-086609, filed Apr. 25, 2017 is expressly incorporated by reference herein.

What is claimed is:

1. An encoder comprising:
 a light emitting portion that emits light;
 an optical element unit that divides the light into first light and second light;
 an optical scale that includes a scale portion constituted with a polarizer, and the scale portion receives the first light and the second light from the optical element unit; and
 a light receiving portion that receives the first light and the second light from the scale portion and outputs a signal corresponding to light intensities of the received first and second lights,
 wherein the first light and the second light overlap on a face of the scale portion.

2. The encoder according to claim 1,
 wherein, when an incident angle of the first light with respect to the scale portion is set as $\theta1$ and an incident angle of the second light with respect to the scale portion is set as $\theta2$, a relationship of $\theta1 \neq \theta2$ is satisfied.

3. The encoder according to claim 1,
 wherein, when an angle formed between an incident direction of the first light and the incident direction of the second light to the scale portion is set as $\theta3$ in plan view when seen from a normal direction of the scale portion, the relationship of $\theta3 < 180°$ is satisfied.

4. The encoder according to claim 1,
 wherein the light receiving portion includes first light receiving element that receives the first light and second light receiving element that receives the second light.

5. The encoder according to claim 4,
 wherein the first light receiving element and the second light receiving element locates at a side opposite to the light emitting portion with respect to a virtual line segment that passes through the center of a portion where the first light and the second light overlap in the plane of the scale portion perpendicular to a virtual line segment connecting the center of the overlapping portion and the center of the light emitting portion, in plan view when seen from the normal direction of the scale portion.

6. The encoder according to claim 5,
 wherein the light emitting portion, the first light receiving element, and the second light receiving element are on the same straight line in plan view.

7. The encoder according to claim 4,
 wherein the light emitting portion, the first light receiving element, and the second light receiving element are on the same straight line when seen from a direction in which the scale portion expands.

8. The encoder according to claim 4,
 wherein the light emitting portion, the first light receiving element, and the second light receiving element are disposed on the same substrate.

9. The encoder according to claim 1,
 wherein the optical scale includes a reflective plate disposed at a side opposite to the light emitting portion with respect to the scale portion.

10. The encoder according to claim 1,
 wherein the optical scale is provided along a circumferential direction around the center axis of the optical scale and has an identification pattern different every 90° or 180° in the circumferential direction.

11. The encoder according to claim 1,
 wherein the optical element unit includes
 a beam splitter that divides the light into the first light and the second light,
 a reflective member that reflects first light from the beam splitter toward the scale portion, and
 a phase difference plate disposed on an optical path of the second light from the beam splitter to the scale portion.

12. An encoder comprising:
 a light emitting portion that emits light;
 an optical element unit that divides the light into first light and second light;
 an optical scale that includes a scale portion constituted with a phase difference plate, and the scale portion receives the first light and the second light from the optical element unit; and
 a light receiving portion that receives the first light and the second light from the scale portion and outputs a signal corresponding to light intensities of the received first and second lights,
 wherein the first light and the second light overlap on a face of the scale portion.

13. A printer comprising:
 the encoder according to claim 1.

14. A printer comprising:
 the encoder according to claim 2.

15. A printer comprising:
the encoder according to claim 3.
16. A printer comprising:
the encoder according to claim 4.
17. A robot comprising:
the encoder according to claim 1.
18. A robot comprising:
the encoder according to claim 2.
19. A robot comprising:
the encoder according to claim 3.
20. A robot comprising:
the encoder according to claim 4.

* * * * *